US012602303B2

(12) United States Patent
Venkatesh et al.

(10) Patent No.: US 12,602,303 B2
(45) Date of Patent: Apr. 14, 2026

(54) SYSTEM AND METHOD FOR PERIPHERAL DEVICE FLEET SIZING AND PERIPHERAL DEVICE WORKSPACE BOOKING FOR SEAMLESS USER EXPERIENCE

(71) Applicant: Dell Products, LP, Round Rock, TX (US)

(72) Inventors: Ramanujam K. Venkatesh, Bangalore (IN); Srinivasa Ragavan Rajagopalan, Bangalore (IN); Anantha K. Boyapalle, Cedar Park, TX (US); Vivekanandh Narayanasamy Rajagopalan, Banaglore (IN)

(73) Assignee: DELL PRODUCTS LP, Round Rock, TX (US)

( * ) Notice: Subject to any disclaimer, the term of this patent is extended or adjusted under 35 U.S.C. 154(b) by 89 days.

(21) Appl. No.: 18/428,169

(22) Filed: Jan. 31, 2024

(65) Prior Publication Data
US 2025/0245113 A1     Jul. 31, 2025

(51) Int. Cl.
*G06F 11/30* (2006.01)
*G06F 8/20* (2018.01)

(52) U.S. Cl.
CPC ............ *G06F 11/3041* (2013.01); *G06F 8/20* (2013.01); *G06F 11/3051* (2013.01)

(58) Field of Classification Search
CPC ..... G06F 11/3041; G06F 11/3051; G06F 8/20
See application file for complete search history.

(56) References Cited

U.S. PATENT DOCUMENTS

| | | | |
|---|---|---|---|
| 9,003,311 B2 | 4/2015 | Reeves et al. | |
| 10,606,725 B2 | 3/2020 | Hanson et al. | |
| 10,681,490 B2 | 6/2020 | Kulkarni et al. | |
| 10,688,385 B2 | 6/2020 | Rose et al. | |
| 11,385,908 B1 | 7/2022 | Kulchytskyy et al. | |
| 2014/0372595 A1* | 12/2014 | Ashok | H04L 67/52 709/224 |
| 2017/0185383 A1* | 6/2017 | Sarkar | G06F 3/04842 |
| 2021/0192484 A1 | 6/2021 | Forutanpour et al. | |
| 2024/0045391 A1* | 2/2024 | Feng | H02J 13/00002 |

* cited by examiner

*Primary Examiner* — Henry Tsai
*Assistant Examiner* — John B Roche
(74) *Attorney, Agent, or Firm* — Prol Intellectual Property Law, PLLC; H. Kenneth Prol

(57) ABSTRACT
A peripheral device workspace cloud orchestrator executing at an information handling system may comprise a hardware processor executing code instructions to define user experience categories for existing peripheral device workspaces identified by peripheral device workspace identification value and a list of peripheral devices operatively at identified locations coupled to user information handling systems acting as anchor nodes for the existing peripheral device workspace and to recommend setup, for each of the user experience categories, a number of reconfigured peripheral device workspaces needed to handle execution of user workloads for all enterprise users based on previously received telemetry measurements for each of the user information handling systems, wherein each of the user experience categories includes a telemetry reading describing a user workload pattern for an anchor node and a combination of peripheral device functional capabilities for the existing peripheral device workspace for handling the user workload.

20 Claims, 5 Drawing Sheets

*FIG. 4*

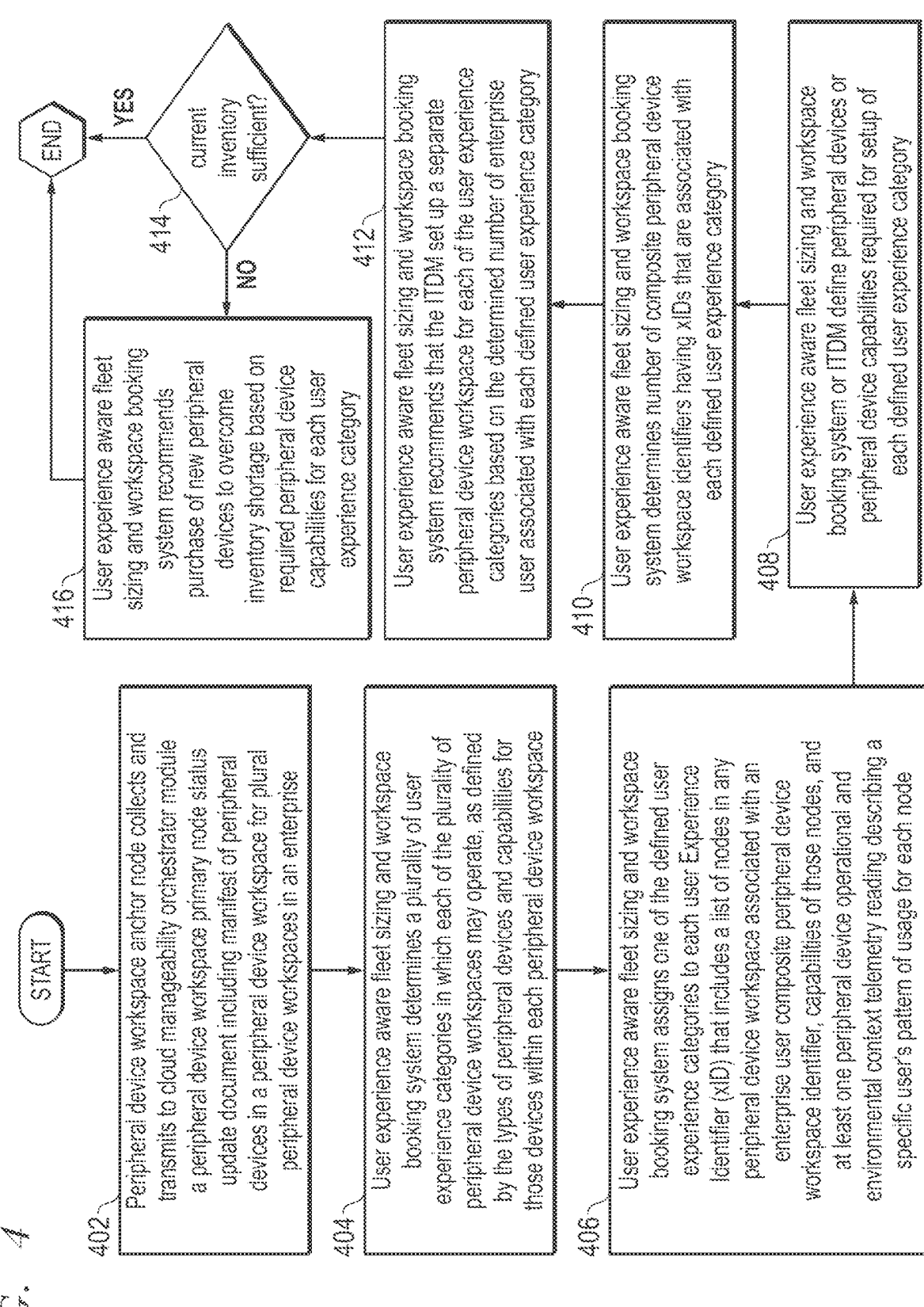

START

402 — Peripheral device workspace anchor node collects and transmits to cloud manageability orchestrator module a peripheral device workspace primary node status update document including manifest of peripheral devices in a peripheral device workspace for plural peripheral device workspaces in an enterprise 404 — User experience aware fleet sizing and workspace booking system determines a plurality of user experience categories in which each of the plurality of peripheral device workspaces may operate, as defined by the types of peripheral devices and capabilities for those devices within each peripheral device workspace 406 — User experience aware fleet sizing and workspace booking system assigns one of the defined user experience categories to each user Experience Identifier (xID) that includes a list of nodes in any peripheral device workspace associated with an enterprise user composite peripheral device workspace identifier, capabilities of those nodes, and at least one peripheral device operational and environmental context telemetry reading describing a specific user's pattern of usage for each node 408 — User experience aware fleet sizing and workspace booking system or ITDM define peripheral devices or peripheral device capabilities required for setup of each defined user experience category 410 — User experience aware fleet sizing and workspace booking system determines number of composite peripheral device workspace identifiers having xIDs that are associated with each defined user experience category 412 — User experience aware fleet sizing and workspace booking system recommends that the ITDM set up a separate peripheral device workspace for each of the user experience categories based on the determined number of enterprise user associated with each defined user experience category 414 — current inventory sufficient?

NO

YES → END

416 — User experience aware fleet sizing and workspace booking system recommends purchase of new peripheral devices to overcome inventory shortage based on required peripheral device capabilities for each user experience category

*FIG. 5*

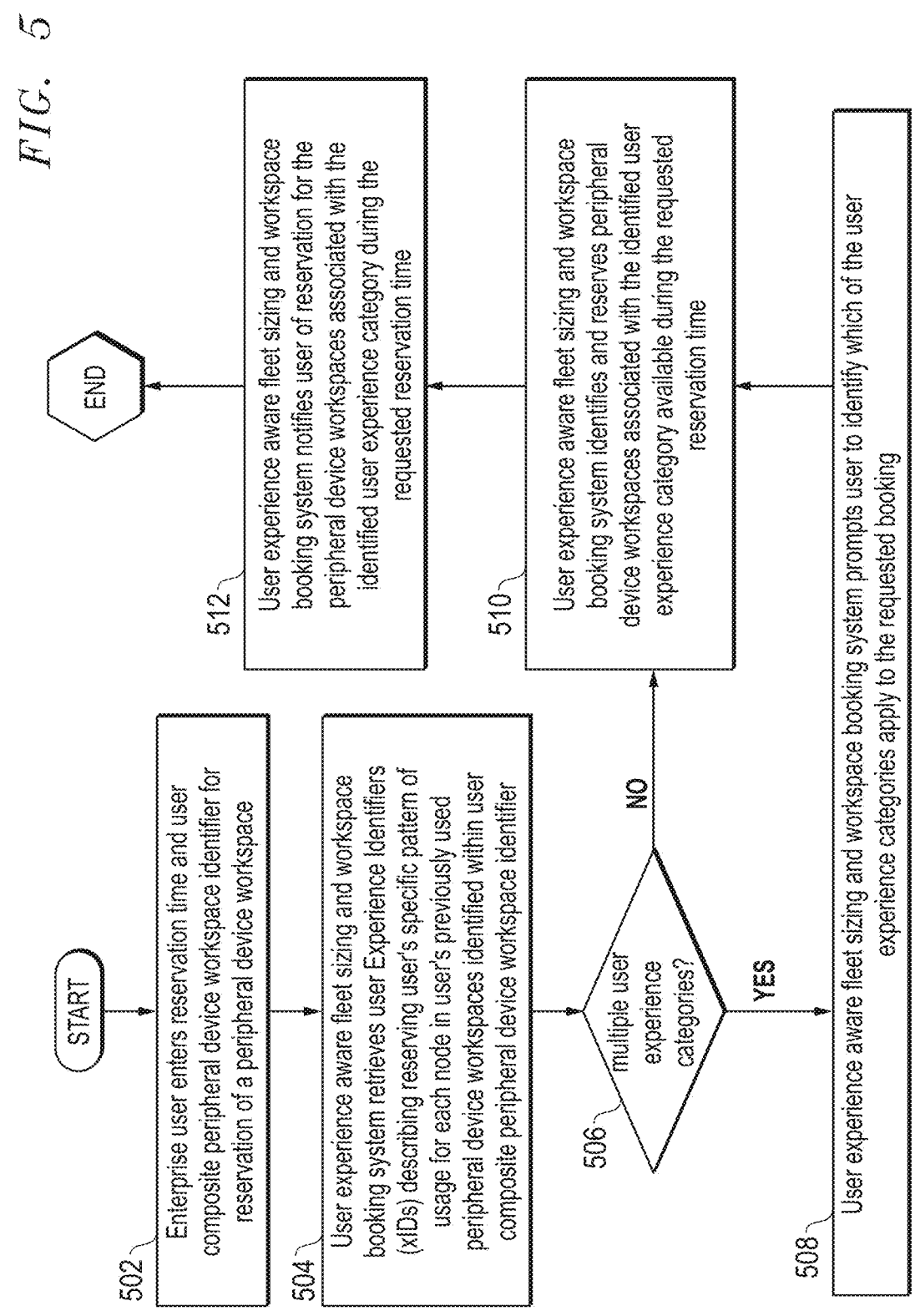

502 — Enterprise user enters reservation time and user composite peripheral device workspace identifier for reservation of a peripheral device workspace 504 — User experience aware fleet sizing and workspace booking system retrieves user Experience Identifiers (xIDs) describing reserving user's specific pattern of usage for each node in user's previously used peripheral device workspaces identified within user composite peripheral device workspace identifier 506 — multiple user experience categories?

NO

YES

508 — User experience aware fleet sizing and workspace booking system prompts user to identify which of the user experience categories apply to the requested booking 510 — User experience aware fleet sizing and workspace booking system identifies and reserves peripheral device workspaces associated with the identified user experience category available during the requested reservation time 512 — User experience aware fleet sizing and workspace booking system notifies user of reservation for the peripheral device workspaces associated with the identified user experience category during the requested reservation time

START

END

SYSTEM AND METHOD FOR PERIPHERAL DEVICE FLEET SIZING AND PERIPHERAL DEVICE WORKSPACE BOOKING FOR SEAMLESS USER EXPERIENCE

FIELD OF THE DISCLOSURE

The present disclosure generally relates to automatic assessment or configuration of peripheral devices for use in a multi-user shared peripheral device workspace. The present disclosure more specifically relates to recommending configuration of a plurality of peripheral device workspaces by an Information Technology Decision Maker (ITDM) for an enterprise. The peripheral device workspace determination for one or more information handling systems is based on usage models of the configured peripheral device workspaces for individual users that are configured for use in a peripheral device workspace environmental context to meet user reservation requests.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more wireless peripheral input/output devices such as a keyboard, mouse, touchpad, gaming controller, display device, wearable peripheral device, speakers, earbud, headphone, microphone, stylus, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4 is a flow diagram illustrating a method of defining a plurality of user experience categories linking usage patterns and workloads with peripheral device capabilities that have previously handled such workloads according to an embodiment of the present disclosure; and FIG. 5 is a flow diagram illustrating a method of tailoring the assignment of users requesting access to a peripheral device workspace during a specific time slot to the specific peripheral device workspace setup that will satisfy the users' needs according to an embodiment of the present disclosure.

The use of the same reference symbols in different drawings may indicate similar or identical items.

DETAILED DESCRIPTION OF THE DRAWINGS

Figure 1:
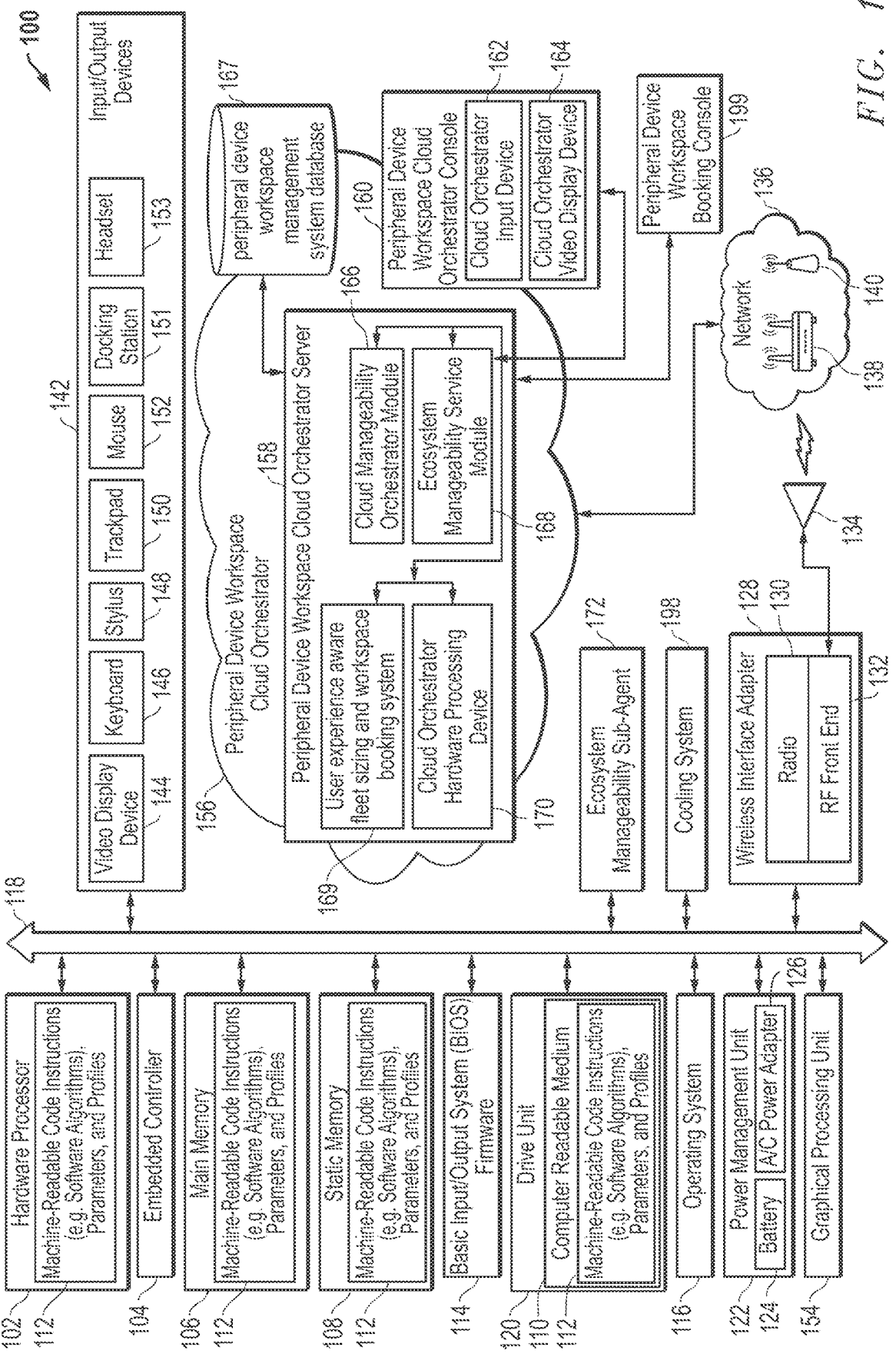
FIG. 1 is a block diagram illustrating an information handling system and a cloud-based information handling system executing code instructions of a peripheral device workspace cloud orchestrator to orchestrate configuration of peripheral devices across a plurality of user peripheral device workspaces according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A user may oftentimes use an information handling system in a peripheral device peripheral device workspace. In this context, a peripheral device workspace can be defined and established with a peripheral device workspace identification value in memory as a location with a manifest of nodes that includes a user information handling system (e.g., a laptop) as an anchor node and peripheral device nodes that are connected to the user information handling system. Environmental context telemetry data may be included with a peripheral device workspace under a peripheral device workspace identification value and include for example, time of day, applications being executed, wireless or wired connection capabilities of nodes, hardware component usage metrics of the anchor node user information handling system, security credentials for the user, and other workspace data. Peripheral devices may commonly include internal or external devices such as displays, a keyboard, a mouse, a webcam, a printer, a speaker, a fingerprint scanner, etc. A peripheral device workspace may include a wired or wireless dock by which the user information handling system connects to some or all the peripheral devices including smart peripheral devices having some compute, input/output or network capabilities.

A peripheral device workspace may, in various embodiments, be used for hybrid work scenarios. For example, a business may have an office space that includes hoteling cubes that can be assigned to, reserved by, or otherwise utilized by a plurality of business's employees as peripheral device workspaces. In such cases, the business may allow its employees to connect their laptops to a dock in a particular hoteling cube where various peripherals may be available for use. In other embodiments, a business may have collaborative peripheral device workspace such as for a conference room or a meeting room. Users may also employ peripheral device workspaces when working from home or other locations. Some peripheral device workspaces may be personal, shared with other users, or collaborative in various embodiments.

When a user employs multiple peripheral device workspaces (e.g., by connecting a laptop to different combinations of peripherals during a workday), it can be tedious for the user to configure the peripheral device workspaces to his or her preferences. Those multiple peripheral device workspaces may be associated with a user under a user composite peripheral device workspace identifier and include an identification of the user. In an example embodiment, while using one peripheral device workspace, the user may set configurations for the peripherals of the peripheral device workspace to match the user's preferences. If the user switches to a different peripheral device workspace, those configurations may not be consistent with the peripherals of the different peripheral device workspace or may result in unintended changes. The user may therefore have to manually reconfigure the peripheral device workspace.

Execution of code instructions for an ecosystem manageability sub-agent on a user information handling system monitors for sets of peripheral device operational and environmental context telemetry readings of a peripheral device workspace, such as time, applications currently executing or planned, hardware component usage metrics, connection type (e.g., wireless, wired, wireless wide area network (WWAN), wireless local area network (WLAN), wireless private area network (WPAN)), security credentials for the user, or environmental sensor readings (e.g., humidity, temperature), among other possible environmental context telemetry readings for the information handling system node and peripheral device nodes in a peripheral device workspace. These peripheral device operational and environmental context telemetry readings associated with a peripheral device workspace identification value may be gathered routinely in telemetry measurements, or upon each startup of an anchor information handling system, for example. Further, the ecosystem manageability sub-agent executing at the information handling system in a peripheral device workspace may create a manifest of peripheral devices at a location to represent the current peripheral device workspace, including an identification of the user, and an identification (e.g., by product serial number or other peripheral device identification) of each of the peripheral device nodes connected to or operably coupled to the anchor information handling system at a peripheral device workspace. Peripheral device workspaces may be associated with a peripheral device workspace identification value and include a location identifier and a manifest of peripheral devices or other nodes, such as anchor node information handling system or smart nodes which is stored in a peripheral device workspace cloud orchestrator server database, peripheral device workspace management system database, or similar cloud based database in embodiments herein.

The hardware processor of the user anchor information handling system may execute code instructions of the ecosystem manageability sub-agent to also collect one or more peripheral device operational and environmental context telemetry readings (e.g., time, applications executing, hardware component usage metrics, or other telemetry data indicating usage patterns for the information handling system in a peripheral device workspace), and one or more peripheral device configuration settings (e.g., resolution for an external display device) for the operably coupled peripheral devices. The manifest of peripheral device nodes and other nodes as well as location of a peripheral device workspace described above may be combined with the peripheral device operational and environmental context telemetry readings for the peripheral device workspace and an identification of the anchor node information handling system user into a peripheral device workspace anchor node status update document written in a machine-readable language or machine markup language such as JavaScript Object Notation (JSON), for example, and transmitted for storage at the peripheral device workspace management system database associated with the peripheral device workspace identification value at a peripheral device workspace management system database operating in a cloud computing platform. The peripheral device workspace identification value for a peripheral device workspace may also have associated with it additional information such as the telemetry information described above or contextual data about the features, operational capabilities, and settings of nodes, including peripheral device nodes, smart peripheral device nodes, and anchor information handling system nodes in particular peripheral device workspaces. Each time a peripheral device configuration setting is changed by the user, a new peripheral device is added to the peripheral device workspace, or changes to peripheral device operational and environmental context telemetry readings for the peripheral device workspace is detected, an updated or a new peripheral device workspace anchor node status update document including this updated configuration may be transmitted to a user experience aware fleet sizing and workspace booking system executing at a peripheral device workspace cloud orchestration server with the peripheral device workspace management system.

Various peripheral device workspaces such as the hybrid work office peripheral device workspaces and other peripheral device workspaces described herein may be defined by location indicator detected for an anchor node information handling system operating at the peripheral device workspace, and a manifest of nodes of peripheral devices and smart devices that may operate in the peripheral device workspace. As described, each such defined peripheral device workspace may also be assigned a peripheral device workspace identification value which may be stored and associated with stored manifests of nodes operating in the peripheral device workspace, at the peripheral device management system database, peripheral device workspace cloud orchestrator server database, or similar remote database. Additional peripheral device operational and environmental context telemetry readings for the peripheral device workspace may be stored within one or more peripheral device workspace anchor node status update documents as well as included in the definition of the peripheral device workspace and associated with its peripheral device workspace identification value defined at the peripheral device workspace cloud orchestrator server database, including peripheral device capabilities, peripheral device connectivity details, current peripheral device configurations or settings, peripheral device setting or configuration options, current status of the peripheral devices within the peripheral device workspace, and other features of nodes within the peripheral device workspace. For example, the definition of the peripheral device workspace associated with a specific peripheral device workspace identification value may include a set of environmental context data and stored within one or more peripheral device workspace anchor node status update documents, such as time, applications currently executing or planned, connection type, hardware component capabilities or usage metrics, or environmental sensor readings (e.g., humidity, temperature), among other possible peripheral device operational and environmental context telemetry readings for an anchor node information handling system operating within the defined peripheral device workspace.

A peripheral device workspace may be defined by a location with a location identifier (e.g., location in a wireless or wired network, global positioning, or other with association with a physical location), a list or manifest of peripheral devices operatively coupled to an anchor node information handling system for a user, and additionally in some cases, by one or more of the peripheral device operational and environmental context telemetry readings for the peripheral device workspace described herein. Each of these defining factors may be associated in memory for the peripheral device workspace management system with the peripheral device workspace identification value, which may also be associated with one or more peripheral device operational configuration policies describing how the peripheral device nodes within the defined peripheral device workspace are to operate. Thus, a particular peripheral device operational configuration policy for one or more peripheral devices within a given peripheral device workspace having a peripheral device workspace identification value may apply only when certain peripheral device operational and environmental context telemetry readings, such as telemetries describing usage patterns for those peripheral devices are detected. In such a way, the peripheral device operational configuration policy for a peripheral device within a peripheral device workspace may be defined or associated with particularly defined usage patterns for that peripheral device. For example, a peripheral device operational configuration policy may apply only when certain software applications are executing at the anchor node information handling system defined within the peripheral device workspace, or when one or more hardware components' (e.g., graphics processing unit (GPU), central processing unit (CPU), memory) usage metrics or connectivity metrics meet a predefined threshold.

The memory for the peripheral device workspace management system may further store a user composite peripheral device workspace identifier that is unique to individual users of one or more defined peripheral device workspaces that are associated with identification of the user of the user's information handling system and peripheral device workspace identification values of the peripheral device workspaces used by that user. Thus, a user composite peripheral device workspace identifier may identify a single user of an anchor node information handling system, and a peripheral device workspace identification value for each of one or more peripheral device workspaces in which the user's information handling system operates as an anchor node at various times. The user composite peripheral device workspace identifier may thus be user-specific and user-centric. The peripheral device workspace identification value, in comparison, may define a location and list of peripheral device nodes, and may thus be peripheral device workspace-centric. Each user composite peripheral device workspace identifier may be associated with a single user, and may further include one or more user experience fingerprints with a user experience identifier (xID) defining usage patterns or the ways in which the single user uses the anchor node information handling system and one or more peripheral devices within defined peripheral device workspaces in which the single user operates.

A user experience fingerprint may include a list of peripheral device nodes within a defined peripheral device workspace associated with a peripheral device workspace identification value and the user's composite peripheral device workspace identifier, as well as capabilities for each of those listed peripheral devices, and at least one peripheral device operational and environmental context telemetry readings of the peripheral device workspace describing a pattern of usage for the specific user of the anchor node information handling system. The user experience fingerprint may be used to link usage patterns for the anchor node information handling system (e.g., execution of specific software applications or high usage rates for various hardware components at the anchor node) with the capabilities and settings for the operatively coupled peripheral devices within the peripheral device workspace. By determining this relationship, the types of peripheral devices, as defined by capabilities, as well as settings for those peripheral devices that can meet the expected workload or future needs for that user may be also determined for peripheral device workspaces.

To this end, the peripheral device workspace management server may execute code instructions of the user experience aware fleet sizing and workspace booking system to automatically associate each user experience fingerprint with an xID with one of a plurality of user experience categories. These user experience categories may define the ways in which the user of the anchor node information handling system for a given peripheral device workspace uses the anchor node and each of the peripheral devices operatively coupled therewith during execution of certain workloads needed for that type of user experience category. Code instructions for the peripheral device workspace management server may be executed to define one or more user experience categories based on, at a minimum, device capabilities for at least one peripheral device identified in the user experience fingerprint, and at least one environmental context data measurement describing a pattern of usage or workload for the specific user of the anchor node information handling system in a peripheral device workspace.

In some cases, these usage patterns may be determined from analysis of the hardware capabilities and hardware component usage metrics for the anchor node information handling system. For example, an anchor node information handling system executing gaming applications may have capabilities and generate different hardware component usage metrics than an anchor node information handling system executing design and development applications or other workplace proficiency software applications. Detection of environmental telemetry data for operational settings and configurations during execution of each type of software application at a peripheral device workspace provides data for a given workspace user experience category in an embodiment. More specifically, an anchor node information handling system executing gaming applications may have a high-end graphics card, a relatively large amount of solid state disk (SSD) storage, or a high-powered fan or other cooling system, and may produce hardware component usage metrics indicating a percentile capacity usage value greater than a threshold value, such as 90% for example, for a graphics processing unit (GPU), or for a hard disk drive (HDD) read/write (RW) capacity. These capabilities and hardware component usage metrics may thus be associated with or define a gaming user experience category. As another example, an anchor node information handling system executing design and development applications may be a graphics tablet with an operating system most often used by design and development employees or other workplace proficiency activity by employees with an accompanying stylus peripheral device, and may produce hardware component usage metrics indicating a percentile capacity usage value greater than a threshold value, for a CPU. These capabilities and hardware component usage metrics for an anchor node information handling system may thus be associated with or define a design and development user experience category or, in other embodiments, some other type of workplace proficiency software user category.

The user experience categories may also be defined by one or more peripheral device capabilities describing the capabilities of the peripheral devices operatively coupled to the anchor node information handling system at the time that the above described anchor node hardware component capabilities and usage metrics are recorded. For example, at the time that the above described anchor node hardware component capabilities and usage metrics associated with the gaming user experience category are recorded, the anchor node may be operatively coupled to a high-resolution, programmable mouse, a keyboard with anti-ghosting and N-key rollover capabilities, and colored backlighting, a high-frequency monitor, and a headset with noise isolation capabilities. One or more of these peripheral device capabilities may thus be used to define a gaming user experience category. As another example, at the time that the above described anchor node hardware component capabilities and usage metrics associated with the design and development user experience category or other type of workplace proficiency software user category are recorded, the anchor node may be operatively coupled to a high-resolution monitor with high-accuracy coloring. One or more of these peripheral device capabilities may thus be used to define a design and development user experience category or other type of workplace proficiency software user category. In such a way, the user experience identifier (xID) may be associated with a peripheral device usage pattern linking user workload and usage patterns at the anchor node information handling system with specific types of peripheral devices and capabilities for those peripheral devices that the user views as capable of handling that specific user workload for a user experience category.

In existing systems, managers for large fleets of information handling systems and peripheral devices, such as an Information Technology Decision Maker (ITDM) for an enterprise or a campus that manages a large number of hoteling cubes and collaborative rooms with peripheral devices such as conference rooms typically remain unaware of the individual user's usage patterns when provisioning these peripheral devices at locations for such hoteling cubes or conference rooms. This can lead to mismatching between individual users' needs and the ITDM-managed peripheral devices at various locations, or a mismatch of ITDM purchases of peripheral devices made without consideration of end users' needs. Execution of code instructions of the user experience aware fleet sizing and workspace booking system leverages the user experience fingerprints and user experience categories, as described directly above, to tailor the size of the peripheral device fleet managed by an ITDM to specific peripheral device workspaces that can be matched to the users' needs.

Code instructions of the user experience aware fleet sizing and workspace booking system in an embodiment may be executed at a peripheral device workspace management server to recommend the ITDM manually divide the peripheral devices for the fleet into a plurality of peripheral device workspaces, each tailored for use according to one of the above-determined user experience categories. As described above, each user experience category may be defined, in part, by the types of peripheral devices within each peripheral devices workspace (e.g., monitor, mouse, keyboard, and headset for a gaming user experience category). As also described above, each user experience category may be further defined by capabilities for each of these peripheral devices, such as, for a gaming user experience category, a high-resolution, programmable mouse, a keyboard with anti-ghosting and N-key rollover capabilities, and colored backlighting, a high-frequency monitor, and a headset with noise isolation capabilities. By referencing these user experience categories associated with known users within the enterprise, code instructions of the user experience aware fleet sizing and workspace booking system may execute to recommend set up of a certain number of peripheral device workspaces best suited for users operating in each of these user experience categories, as per the number of users associated with each category and user experience identifiers (xIDs) associated with those users and their user composite peripheral device workspace identifiers.

Code instructions for the user experience aware fleet sizing and workspace booking system may execute to determine when the current fleet of peripheral devices managed by the ITDM is insufficient to perform the recommended setup of user experience categories described directly above. For example, the user experience aware fleet sizing and workspace booking system may execute code instructions to determine that an insufficient number of high-resolution monitors available within the fleet to set up the recommended number of peripheral device workspaces for a given user experience category. When such an insufficiency is identified, the user experience aware fleet sizing and workspace booking system may execute code instructions to automatically generate recommendations that the ITDM purchase one or more new peripheral devices having capabilities given within the definition of the user experience category for which an insufficient number of devices have been identified. In some cases, the user experience aware fleet sizing and workspace booking system may identify a specific model available for sale via an online product purchase platform in communication with the user experience aware fleet sizing and workspace booking system.

Following set up of a plurality of peripheral device workspaces by an ITDM according to the user experience aware fleet sizing and workspace booking system recommendations described above, users may reserve peripheral device workspaces tailored to their specific needs, based on the user experience category in which the user has identified they will be working, or in which it is estimated that the user will be working and an xID for peripheral device usage patterns linking expected user workload and usage patterns at the user's anchor node information handling system with specific types of peripheral devices and their capabilities. Upon receiving a request by a user to reserve a peripheral device workspace for a particular time slot, the user experience aware fleet sizing and workspace booking system may execute code instructions to determine the user experience category for the user xID, given within the user's unique user composite peripheral device workspace identifier. In some cases, a user's composite peripheral device workspace identifier may be associated with multiple user experience categories and multiple xIDs. In such a case, the user may be asked to specify one of these user experience categories for which the user is reserving the peripheral device workspace. In other embodiments, code instructions for the user experience aware fleet sizing and workspace booking system may rank each of the user's user experience categories according to likelihood the user will be operating in that user experience category, based at least in part on previous usage patterns for that user, or access to calendar scheduling, as described in datasets of sessions associated with the users' composite peripheral device workspace identifier. Code instructions for the user experience aware fleet sizing and workspace booking system may then execute to identify one of the peripheral device workspaces set up by the ITDM with a user experience category in which the requesting user will be operating and that is available during the requested time slot and can meet the xID for the user. The user experience aware fleet sizing and workspace booking system may execute code instructions to reserve the identified peripheral device workspace with the best ranked matching user experience category for the user and notify the user of the reservation. In such a way, the user experience aware fleet sizing and workspace booking system may tailor the assignment of users to specific peripheral device workspaces to the users' needs.

FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality. It is appreciated that, in some embodiments herein, the information handling system 100 may be one of a plurality of device nodes as part of a peripheral device workspace described in embodiments herein, or an information handling system 100 may serve as a peripheral device workspace cloud orchestrator server 158 that is operatively coupled to a peripheral device workspace cloud orchestrator console 160 in the peripheral device workspace cloud orchestrator 156 described herein. In an embodiment, the cloud orchestrator console 160 may also be an information handling system 100 itself that is used by an internet technology decision maker (ITDM) in some embodiments to define minimum peripheral device capabilities for each of a plurality of user experience categories as described herein for configuration of node devices within a peripheral device workspace such as the information handling system 100, a docking station 151, video display device 144, keyboard 146, stylus 148, trackpad 150, mouse 152, and the like. In this embodiment, the information handling system 100, may receive the minimum peripheral device capabilities selected by the ITDM at the peripheral device workspace cloud orchestrator console 160, or generated by the peripheral device workspace cloud manageability orchestrator module 166 via execution of code instructions of the user experience aware fleet sizing and workspace booking system 169, the cloud manageability orchestrator module 166, and the ecosystem manageability service module 168 at the peripheral device workspace cloud orchestrator server 158 as described in embodiments herein.

Thus, in a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 154, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as a docking station 151, a mouse 152, a trackpad 150, a keyboard 146, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 154, or any other hardware processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wired or wireless communication with the I/O devices 142 such as a docking station 151, a keyboard 146, a mouse 152, video display device 144, stylus 148, or trackpad 150 among other peripheral devices any combination of which may form one or more various peripheral device workspaces according to embodiments herein.

The information handling system 100 further includes a video/graphics display device 144. The video/graphics display device 144 in an embodiment may function as a liquid crystal display (LCD), an organic light emitting diode (OLED), a flat panel display, or a solid-state display. It is appreciated that the video/graphics display device 144 may be wired or wireless and may be an external video/graphics display device 144 that allows a user to increase the desktop area by extending the desktop in an embodiment. Additionally, as described herein, the information handling system 100 may include or be operatively coupled to one or more other I/O devices 142 including the wired or wireless mouse 152 described herein that allows the user to interface with the information handling system 100 via the video/graphics display device 144, a cursor control device (e.g., a trackpad 150, or gesture or touch screen input), a stylus 148, and/or a keyboard 146, among others. Information handling system 100 may also be operatively coupled to a peripheral device 142 such as a docking station 151 or other smart peripheral device having a hardware processing device such as a hardware processor, microcontroller, or other hardware processing resource and which may further be operatively coupled to one or more additional peripheral devices 142. As described herein, each of these input/output devices 142 may each be a node device associated with the information handling system 100 and may be part of a peripheral device workspace defined and identified with a peripheral device workspace identification value via execution of the ecosystem manageability service module 168 and cloud manageability orchestrator module 166, as described in embodiments herein. Various drivers and hardware control device electronics may be operatively coupled to operate the I/O devices 142 according to the embodiments described herein. The present specification contemplates that the I/O devices 142 may be wired or wireless.

A network interface device of the information handling system 100 shown as wireless interface adapter 128 can provide connectivity among devices such as with Bluetooth® or to a network 136, e.g., a wide area network (WAN), a local area network (LAN), wireless local area network (WLAN), a wireless personal area network (WPAN), a wireless wide area network (WWAN), or other network. In an embodiment, this network 136 may be operatively coupled to or include a peripheral device workspace cloud orchestrator 156 that includes one or more servers (e.g., peripheral device workspace cloud orchestrator server 158) or other computing devices that provide computer system resources as described herein that allow for the creation and maintenance of peripheral device workspaces and orchestration of different node devices within one or more peripheral device workspaces. In embodiments described herein, the wireless interface device 128 with its radio 130, RF front end 132 and antenna 134 is used to communicate with the wireless peripheral devices via, for example, a Bluetooth® or Bluetooth® Low Energy (BLE) protocols. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a hardware device connected to a network 136 may communicate voice, video, or data over the network 136. Further, the instructions 112 may be transmitted or received over the network 136 via the network interface device or wireless interface adapter 128. It is appreciated that any computing device including the user experience aware fleet sizing and workspace booking system 169, the cloud orchestrator server 158, the cloud orchestrator console 160, and the information handling system 100 may include a computer-readable medium that includes instructions, parameters, and profiles 112.

The information handling system 100 may include a set of instructions 112 that may be executed to cause the computer system to perform any one or more of the methods or computer-based functions disclosed herein. For example, instructions 112 may be executed by a hardware processor 102, GPU 154, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 154 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120, which may act as a solid state drive (SSD) during execution by the hardware processor 102, EC 104, or GPU 154 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 154, SSD 120, a video/graphic display device 144, or other wired I/O devices 142 such as the mouse 152, the stylus 148, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 is operatively coupled to a peripheral device workspace cloud orchestrator 156 that includes any number of servers, computing devices, and other cloud computing resources such as the peripheral device workspace cloud orchestrator server 158. The peripheral device cloud orchestrator 156 may, therefore, include any hardware that may be distributed over multiple physical locations but act in concert with each other and specifically the peripheral device workspace cloud orchestrator server 158 to facilitate maintenance and implementation of peripheral device operational configuration policies for a plurality of peripheral device workspaces, wherein the one or more node devices (e.g., including the information handling system 100 as an anchor node device, and one or more peripheral device nodes such as I/O devices 142) form part of each peripheral device workspace, create or adjust peripheral device operational configuration policies based on the registered node devices detected within the one or more created peripheral device workspaces, and apply the peripheral device operational configuration policies to the created peripheral device workspace(s). It is appreciated that the node devices described herein may include each of the peripheral devices operatively coupled to the information handling system 100 acting as a primary or anchor node device and the workspaces created may be described as a peripheral device workspace.

The peripheral device workspace cloud orchestrator server 158 may be any computing device that may include similar elements as the information handling system 100 such as a memory device, a cloud orchestrator hardware processing device 170, a PMU, and other elements that allow the peripheral device workspace cloud orchestrator server 158 to execute code instructions of the cloud manageability orchestrator module 166, ecosystem manageability service module 168, user experience aware fleet sizing and workspace booking system 169, and other software as described herein. In an embodiment, the peripheral device workspace cloud orchestrator server 158 may be operatively coupled to a peripheral device workspace cloud orchestrator console 160 and to a peripheral device workspace booking console 199. The peripheral device workspace cloud orchestrator console 160 may be used by the ITDM in some embodiments to select one or more peripheral device functional capabilities requirements for each of a plurality of user experience categories defined by the user experience aware fleet sizing and workspace booking system 169, or to manage dynamic peripheral device workspace sessions (e.g., associate a user's identification with a peripheral device workspace with a user composite peripheral device workspace identifier). It is appreciated that the peripheral device workspace cloud orchestrator console 160 may include a cloud orchestrator input device 162 and a cloud orchestrator video display device 164 that allows the ITDM to complete these processes and engage with the peripheral device workspace cloud orchestrator server 158 in an embodiment.

The peripheral device workspace booking console 199 in an embodiment may be a graphical user interface that is used by a peripheral device workspace user attempting to reserve an available peripheral device workspace managed by the ITDM. In such an embodiment, the reserving user may use the peripheral device workspace booking console 199 to enter a reservation time and a user composite peripheral device workspace identifier for the user to reserve a peripheral device workspace for that user. In an embodiment described with reference to FIG. 1, the user experience aware fleet sizing and workspace booking system 169 may display each of the user experience categories identified as associated with the user's xIDs to the user via the peripheral device workspace booking console 199. The user may then use the peripheral device workspace booking console 199 in such an embodiment to select one of the displayed user experience categories. Upon determination by the user experience aware fleet sizing and workspace booking system 169 of an available peripheral device workspace having a user experience category matching the expected workload for the requesting user in an embodiment, the peripheral device workspace booking console 199 may also display instructions for the user to occupy the peripheral device workspaces selected by the fleet sizing and workspace booking system 169 based on matching the user experience category with a user.

A node device database operatively coupled to the peripheral device workspace cloud orchestrator server 158 may provide the peripheral device workspace cloud orchestrator server 158 with details regarding the node devices detected and forming the peripheral device workspaces and associated particular peripheral device workspace identification values described herein. For example, the node device database may include data regarding the possible settings for any given node device, compatibility of these node devices with other node devices within any given peripheral device workspace, and capabilities of the node devices among other characteristics and features of the node devices.

An information handling system 100 that is operatively connected to one or more peripheral devices 142 in an embodiment may operate as an anchor node for the peripheral device workspace in that it gathers capabilities and peripheral device operational and environmental context telemetry readings about all of the peripheral devices 142, within a given peripheral device workspace, as described directly below, communicates that peripheral device operational and environmental context telemetry readings to the cloud manageability orchestrator module 166, receives peripheral device operational configuration policies describing how to configure the peripheral devices 142, and the anchor node information handling system 100 itself, and implements peripheral device operational configuration policies. As new nodes are added to the peripheral device workspace, the cloud-based additional node automatic configuration module 169 may determine the best or most appropriate peripheral device operational configuration policies for a given peripheral device workspace, based on previously defined peripheral device operational configuration policies set by an ITDM or by a user for various other peripheral devices 142 previously established within existing peripheral device workspaces, and a comparison of capabilities for the newly added node and other peripheral devices 142 previously added to the peripheral device workspace. Such a determination may further depend upon the peripheral device operational and environmental context telemetry readings, which may include, for example, time of day, applications being executed, wireless or wired connection capabilities, or security credentials for the user. In such a way, execution of code instructions of the additional node automatic configuration module may automatically update peripheral device configurations for newly added nodes within a peripheral device workspaces to match current peripheral device operational and environmental context telemetry readings.

As described herein, the peripheral device workspace cloud orchestrator server 158 includes a computer-readable program code of a peripheral device workspace cloud manageability orchestrator module 166 that, when executed by the cloud orchestrator hardware processing device 170 of the peripheral device workspace cloud orchestrator server 158, manages creation and adjustment of peripheral device operational configuration policies for one or more node devices. In the context of the present specification and in the appended claims, a peripheral device workspace may be an ecosystem of node devices (e.g., including peripheral devices coupled to the information handling system 100, a docking station 151, etc.) connected to a central, main, or anchor node device such as the information handling system 100. In an embodiment, a peripheral device workspace may also be defined with a peripheral device workspace identification value and part of a user composite peripheral device workspace identifier associated with each of the information handling system 100 and peripheral devices (e.g., input/output devices 142) such that a user may have multiple peripheral device workspaces having peripheral device workspace identification values associated with the user based on the context and/or environment of each identified peripheral device workspace. For example, a user composite peripheral device workspace identifier may be used to define a first peripheral device workspace at a home office having a first peripheral device workspace identification value, a second peripheral device workspace at a work office or a collaborative peripheral device workspace such as a conference room having a second peripheral device workspace identification value, a third peripheral device workspace at a different location (e.g., a coffee shop) having a third peripheral device workspace identification value, and other peripheral device workspaces that can be defined by both the node devices included within the peripheral device workspace and the location of the peripheral device workspace (e.g., defined by location data such as GPS data or with network data) and having a having a peripheral device workspace identification value.

The peripheral device workspace management system database 167 may further store a user composite peripheral device workspace identifier that is unique to individual users of one or more defined peripheral device workspaces that are associated with identification of the user of the user's information handling system 100 and peripheral device workspace identification values of the peripheral device workspaces used by that user. Thus, a user composite peripheral device workspace identifier may identify a single user of an anchor node information handling system 100, and a peripheral device workspace identification value for each of one or more peripheral device workspaces in which the user's information handling system 100 operates as an anchor node at various times. The user composite peripheral device workspace identifier may thus be user-specific and user-centric. The peripheral device workspace identification value, in comparison, may define a location and list of peripheral device nodes 142, and may thus be peripheral device workspace-centric.

Each user composite peripheral device workspace identifier may be associated with a single user, and may further include one or more user experience fingerprints with a user experience identifier (xID) defining usage patterns or the ways in which the single user uses the anchor node information handling system and one or more peripheral devices within defined peripheral device workspaces in which the single user operates. A user experience fingerprint may include a list of peripheral device nodes within a defined peripheral device workspace associated with a peripheral device workspace identification value and the user's composite peripheral device workspace identifier, as well as capabilities for each of those listed peripheral devices, and at least one type of peripheral device operational and environmental context telemetry readings of the peripheral device workspace describing a pattern of usage for the specific user of the anchor node information handling system 100. The user experience fingerprint may be used to link usage patterns for the anchor node information handling system 100 (e.g., execution of specific software applications or high usage rates for various hardware components such as 102, 104, 106, 108, 120, or 154 at the anchor node 100) with the capabilities and settings for the operatively coupled peripheral devices 142 within the peripheral device workspace for a user experience category. By determining this relationship, the types of peripheral devices 142, as defined by capabilities, as well as settings for those peripheral devices that can meet the expected workload or future needs for that user may be also determined for peripheral device workspaces such as for particular user experience categories.

To this end, the peripheral device workspace management server 158 may execute code instructions of the user experience aware fleet sizing and workspace booking system 169 to automatically associate each user experience fingerprint with an xID with one of a plurality of user experience categories. These user experience categories may broadly define the ways in which the user of the anchor node information handling system 100 for a given peripheral device workspace uses the anchor node 100 and each of the peripheral devices 142 operatively coupled therewith during execution of certain workloads. Code instructions for the peripheral device workspace management server 158 may be executed to define one or more user experience categories based on, at a minimum, device capabilities for at least one peripheral device 142 identified in the user experience fingerprint, and at least one environmental context data measurement describing a pattern of usage or workload for the specific user of the anchor node information handling system 100 in a peripheral device workspace.

Execution of code instructions for an ecosystem manageability sub-agent 172 on a user information handling system 100 monitors for sets of peripheral device operational and environmental context telemetry readings of a peripheral device workspace, such as time, applications currently executing or planned, hardware component usage metrics, connection type (e.g., wireless, wired, wireless wide area network (WWAN), wireless local area network (WLAN), wireless private area network (WPAN)), security credentials for the user, or environmental sensor readings (e.g., humidity, temperature, ambient light), among other possible environmental context telemetry readings for the information handling system node 100 and peripheral device nodes 142 in a peripheral device workspace 100. These peripheral device operational and environmental context telemetry readings associated with a peripheral device workspace identification value may be gathered routinely in telemetry measurements, or upon each startup of an anchor information handling system 100, for example. The ecosystem manageability sub-agent 172 executing at the information handling system 100 in a peripheral device workspace may create a manifest of peripheral device nodes 142 and other nodes for a peripheral device workspace identification value to represent the current peripheral device workspace, including an identification of a location, an identification of the user, and an identification (e.g., by product serial number or other peripheral device identification) of each of the peripheral device nodes 142 connected to or operably coupled to the anchor information handling system 100 at a peripheral device workspace. Identification of the each of the peripheral device nodes 142 may include or be associated with an orchestrated device descriptor (ODD) for the node in various embodiments herein.

The hardware processor 102 of the user anchor information handling system 100 may execute code instructions of the ecosystem manageability sub-agent 172 to also collect one or more peripheral device operational and environmental context telemetry readings (e.g., time, applications executing, hardware component usage metrics, or other telemetry data indicating usage patterns for the information handling system 100 in a peripheral device workspace), and one or more peripheral device 142 configuration settings (e.g., resolution for an external display device 144) for the operably coupled peripheral devices 142. The manifest of peripheral device nodes 142 and other nodes as well as location of a peripheral device workspace described above may be combined with the peripheral device operational and environmental context telemetry readings for the peripheral device workspace and an identification of the anchor node information handling system 100 user into a peripheral device workspace anchor node status update document written in a machine-readable language or machine markup language such as JavaScript Object Notation (JSON), for example, and to be associated with a peripheral device workspace identification value. The peripheral device workspace anchor node status update document may be transmitted for storage with the peripheral device workspace identification value at a peripheral device workspace management system database 167 operating in a cloud computing platform 156. Each time a peripheral device configuration setting is changed by the user, a new peripheral device is added to the peripheral device workspace, or changes to peripheral device 142 operational and environmental context telemetry readings for the peripheral device workspace is detected, a new peripheral device workspace anchor node status update document including this updated configuration may be transmitted to the peripheral device workspace cloud orchestrator 156 executing a peripheral device workspace cloud orchestration server 158.

In some cases, usage patterns for determining user experience categories may be gleaned from analysis of the hardware capabilities and hardware component usage metrics for various hardware components (e.g., 102, 104, 106, 108, 120, or 154) at the anchor node information handling system 100. For example, an anchor node information handling system 100 executing gaming applications may have capabilities and generate different hardware component usage metrics than an anchor node information handling system 100 executing design and development applications or other type of workplace proficiency software. More specifically, an anchor node information handling system 100 executing gaming applications may have a high-end graphics process unit (GPU) 154, a relatively large amount of solid state disk (SSD) 120 storage, or a high-powered fan or other cooling system 198, and may produce hardware component usage metrics indicating a percentile capacity usage value greater than a threshold value, such as 90% for example, for GPU 154 or for a hard disk drive (HDD) 104 read/write (RW) capacity. These capabilities and hardware component usage metrics may thus be associated with or define a gaming user experience category. As another example, an anchor node information handling system 100 executing design and development applications or other type of workplace proficiency software may be a graphics tablet with an operating system 116 most often used by design and development employees or other type of type of workplace proficiency software user with an accompanying stylus peripheral device 148, and may produce hardware component usage metrics indicating a percentile capacity usage value greater than a threshold value, for a CPU 102. These capabilities and hardware component usage metrics for an anchor node information handling system 100 may thus be associated with or define a design and development user experience category or other type of workplace proficiency software user category. As yet another example, an anchor node information handling system 100 may be executing a videoconferencing application, which may define a meeting mode.

The user experience categories may also be defined by one or more peripheral device capabilities describing the capabilities of the peripheral devices 142 operatively coupled to the anchor node information handling system 100 at the time that the above described anchor node hardware component capabilities and usage metrics are recorded. For example, at the time that the above described anchor node hardware component capabilities and usage metrics associated with the gaming user experience category are recorded within a peripheral device workspace anchor node status update document as described above, the anchor node 100 may be operatively coupled to a high-resolution, programmable mouse 152, a keyboard 146 with anti-ghosting and N-key rollover capabilities, and colored backlighting, a high-frequency monitor 144, and a headset 153 with noise isolation capabilities. One or more of these peripheral device capabilities may thus be used to define a gaming user experience category. As another example, at the time that the above described anchor node hardware component capabilities and usage metrics associated with the design and development user experience category or other type of workplace proficiency software user category are recorded, the anchor node 100 may be operatively coupled to a high-resolution monitor with high-accuracy coloring. One or more of these peripheral device capabilities may thus be used to define a design and development user experience category or other type of workplace proficiency software user category. As yet another example, an anchor node information handling system 100 executing a videoconferencing application may have a minimum threshold recording resolution for a webcam peripheral device, or a minimum sound quality threshold for an external speaker peripheral device. In such a way, the user experience identifier (xID) may be associated with a peripheral device usage pattern linking user workload and usage patterns at the anchor node information handling system 100 with specific types of peripheral devices 142 and capabilities for those peripheral devices 142 that the user views as capable of handling that specific user workload for a user experience category.

Code instructions for the user experience aware fleet sizing and workspace booking system 169 in an embodiment may also execute to define peripheral devices or peripheral device capabilities required for setup of a peripheral device workspace according to each defined user experience category. For example, the user experience aware fleet sizing and workspace booking system 169 may execute code instructions to require any given peripheral device workspace that is setup for a given user experience category to include peripheral devices, such as those in 142, that have the peripheral device functional capabilities that define that user experience category. More specifically, in an embodiment in which gaming mode is a defined user experience category, as described above, code instructions of the user experience aware fleet sizing and workspace booking system 169 may execute to require minimum peripheral device capabilities for the gaming mode to include one or more of a high-resolution, programmable mouse 152, a keyboard 146 with anti-ghosting and N-key rollover capabilities, and colored backlighting, a high-frequency monitor 144, and a headset 153 with noise isolation capabilities. As another example, in an embodiment in which design and development mode or other type of workplace proficiency software mode is a defined user experience category, as described above, code instructions of the user experience aware fleet sizing and workspace booking system 169 may execute to require minimum peripheral device capabilities for the design and development mode or other type of workplace proficiency software mode to include a high-resolution monitor with high-accuracy coloring. In yet another example, in an embodiment in which meeting mode is a defined user experience category, as described above, code instructions of the user experience aware fleet sizing and workspace booking system 169 may execute to require a minimum threshold recording resolution for a webcam peripheral device, or a minimum sound quality threshold for an external speaker peripheral device.

In some embodiments, these require peripheral device capabilities may be auto-populated through execution of code instructions for the user experience aware fleet sizing and workspace booking system 169. In other embodiments, the ITDM for the enterprise may be prompted to select one or more of these peripheral device capabilities defining the user experience categories as minimum requirements for each peripheral device workspaces setup to accommodate those user experience categories. For example, the ITDM may select one or more of the above-listed peripheral device capabilities for the gaming mode, the design and development mode, workplace proficiency software mode, or the meeting mode via the peripheral device workspace cloud orchestrator console 160.

Execution of code instructions of the user experience aware fleet sizing and workspace booking system 169 leverages the user experience fingerprints and user experience categories, as described directly above, to tailor the size of the peripheral device fleet (e.g., including 142) managed by an ITDM to specific peripheral device workspaces that can be matched to the users' needs. Code instructions of the user experience aware fleet sizing and workspace booking system 169 in an embodiment may be executed at a peripheral device workspace management server 158 to recommend the ITDM manually divide the peripheral devices (e.g., including 142) for the fleet into a plurality of peripheral device workspaces, each tailored for use according to one of the above-determined user experience categories, and to determine when the current fleet of peripheral devices (e.g., including 142) managed by the ITDM is insufficient to perform the recommended setup of a plurality of peripheral device workspaces according to user experience categories, as described in greater detail below with respect to FIGS. 3 and 4.

Following set up of a plurality of peripheral device workspaces by an ITDM according to the user experience aware fleet sizing and workspace booking system 169 recommendations described above, users may reserve peripheral device workspaces tailored to their specific needs, based on the user experience category in which the user has identified they will be working, or in which it is estimated that the user will be working, and based on an xID for peripheral device usage patterns linking expected user workload and usage patterns at the user's anchor node information handling system 100 with specific types of peripheral devices such as 142 and their capabilities. Upon receiving a request by a user to reserve a peripheral device workspace for a particular time slot, the user experience aware fleet sizing and workspace booking system 169 may execute code instructions to determine the user experience category for the user xID, given within the user's unique user composite peripheral device workspace identifier. In some cases, a user's composite peripheral device workspace identifier may be associated with multiple user experience categories and multiple xIDs. In such a case, the user may specify one of these user experience categories for which the user is reserving the peripheral device workspace using the peripheral device workspace booking console 199.

In other embodiments, code instructions for the user experience aware fleet sizing and workspace booking system 169 may rank each of the user's user experience categories according to likelihood the user will be operating in that user experience category, based at least in part on previous usage patterns for that user, or access to calendar scheduling, as described in datasets of sessions associated with the users' composite peripheral device workspace identifier. Code instructions for the user experience aware fleet sizing and workspace booking system 169 may then execute to identify one of the peripheral device workspaces set up by the ITDM with a user experience category in which the requesting user will be operating and that is available during the requested time slot and can meet the xID for the user. The user experience aware fleet sizing and workspace booking system 169 may execute code instructions to reserve the identified peripheral device workspace with the best ranked matching user experience category for the user and notify the user of the reservation via the peripheral device workspace booking console 199. In such a way, the user experience aware fleet sizing and workspace booking system 169 may tailor the assignment of users to specific peripheral device workspaces to the users' needs.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
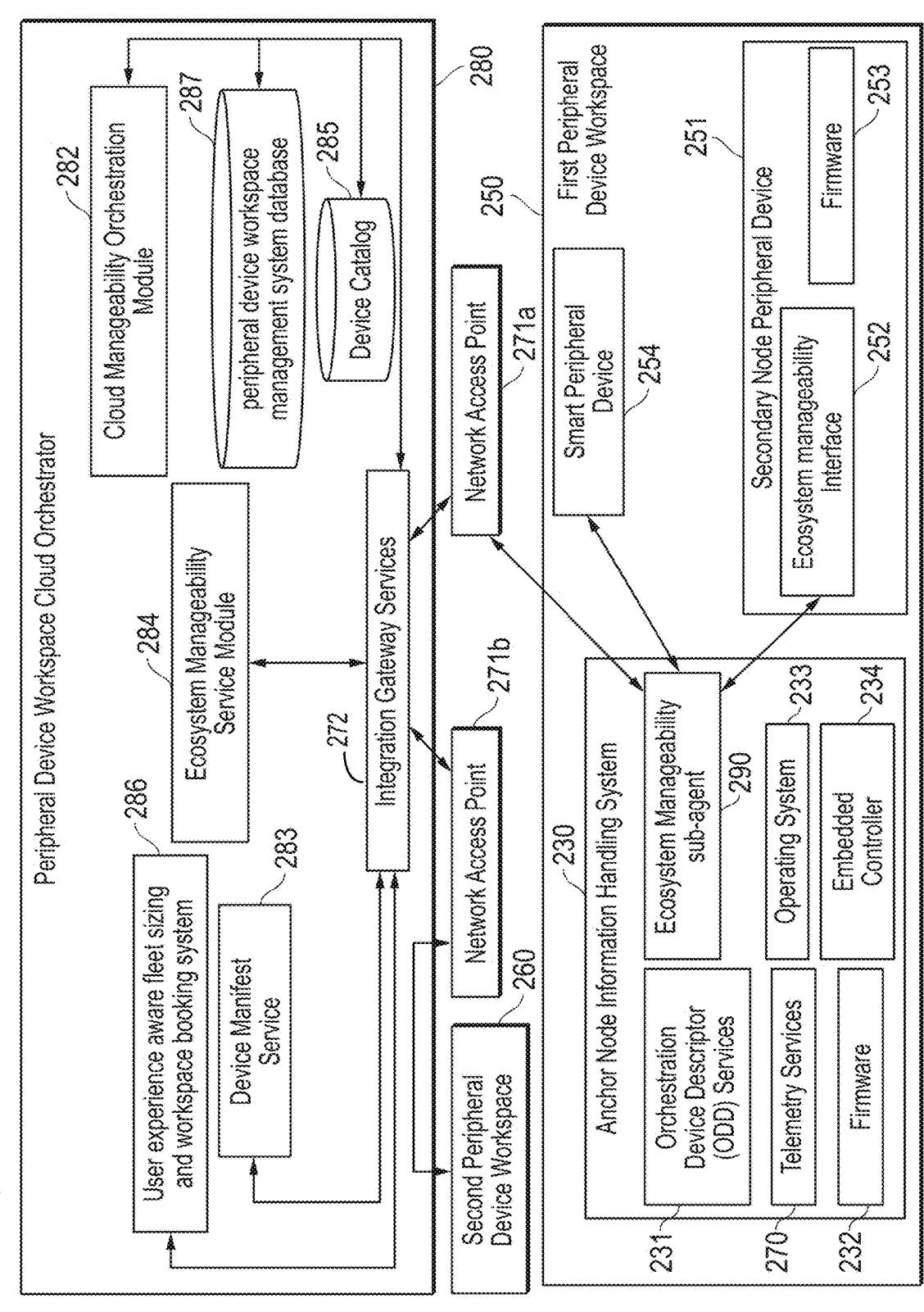
FIG. 2 is a block diagram illustrating a cloud-based peripheral device workspace cloud orchestrator for defining a first peripheral device workspace including a user information handling system and peripheral devices according to an embodiment of the present disclosure.

FIG. 2 is a block diagram illustrating a cloud-based peripheral device workspace cloud orchestrator executing at one or more peripheral device workspace cloud orchestrator servers for defining a first of a plurality of peripheral device workspaces in which a user information handling system operatively couples with a first plurality of peripheral devices according to an embodiment of the present disclosure. As described previously, a user may oftentimes use an information handling system 230 in a peripheral device workspace 250 or 260. In this context, a peripheral device workspace 250 or 260 can be defined and established with a peripheral device workspace identification value in a memory database, such as peripheral device workspace management system database 287 as a location with a manifest of nodes that includes a user information handling system 230 (e.g., a laptop) as an anchor node and peripheral device nodes 251 and 254 that are connected to the user information handling system 230. Anchor information handling system 230 may be an information handling system similar to that described in FIG. 1 and include one or more hardware processing resources, including an embedded controller 234, as described to execute various firmware 232 as well as software such as operating system 233 in embodiments herein. Environmental context telemetry data may gathered by execution of code instructions for a telemetry services application 270 operating in software or firmware 232 on the anchor user information handling system 230 and be included with a peripheral device workspace 250 or 260 under a peripheral device workspace identification value at memory database 287 and include for example, time of day, applications being executed, wireless or wired connection capabilities of nodes 251 or 254, hardware component usage metrics of the anchor node user information handling system 230, security credentials for the user, and other workspace data. Peripheral devices 251 and 254 may commonly include internal or external devices such as displays, a keyboard, a mouse, a webcam, a printer, a speaker, a fingerprint scanner, etc. A peripheral device workspace 250 or 260 may include a wired or wireless dock by which the user information handling system 230 connects to some or all the peripheral devices 251 including smart peripheral devices 254 having some compute, input/output or network capabilities. Peripheral device 254 in an example embodiment may considered a "smart" peripheral device because it may operate an agent or firmware, and include a network interface device or wireless receiver that makes the smart peripheral device 254 capable of direct communication with the cloud-based peripheral device workspace cloud orchestrator 280 via the integration gateway services 272 and the network access point 271 for some subset of secondary nodes. Similarly, a primary or anchor node information handling system 230 is also capable of direct communication with the cloud-based peripheral device workspace cloud orchestrator 280 via the integration gateway services 272 and the network access point 271 for some or all secondary nodes in the peripheral device workspace 250 or 260.

A peripheral device workspace 250 or 260 may oftentimes be used for hybrid work scenarios. For example, a business may have an office space that includes hoteling cubes that can be assigned to, reserved by, or otherwise utilized by a plurality of business's employees as peripheral device workspaces 250 or 260. In such cases, the business may allow its employees to connect their laptops to a dock in a particular hoteling cube where various peripherals may be available for use. A business may also have a collaborative peripheral device workspace 250 or 260 that may be a conference room or meeting room where plural users with plural primary node information handling systems 230 utilize some or all peripheral device nodes in that peripheral device workspace at the same time. Users may also employ peripheral device workspaces 250 or 260 when working from home or other locations. Some peripheral device workspaces such as 250 or 260 may be personal, shared with other users, or collaborative in various embodiments.

The peripheral device workspace cloud orchestrator 280 may gather information regarding the range of capabilities for each peripheral device such as 251 and 254 within each peripheral device workspace such as 250 or 260, and for each user across an enterprise in an embodiment. Each peripheral device, such as 251 may include a range of capabilities, and the user may choose to configure the peripheral device 251 to operate according to a selected setting or configuration within this range of capabilities. The information defining the range of functional capabilities for the peripheral device 251 may be stored at the peripheral device 251, within the firmware 253, or may be stored at an orchestration device descriptor (ODD) service at 251 that operates similarly to the ODD service 231 for the anchor node 230. In an embodiment, the ODD service 231 for the anchor node 230 or a similar service for the peripheral device 251 may also store static or non-adjustable features for the anchor node 230 or peripheral device 251 respectively, such as locations for various ports, physical dimensions of the anchor node 230 or peripheral device 251, or physical locations for internal components such as an embedded camera. Model number, device number, serial number media access control (MAC) address, or other identifying information for the anchor node 230 or peripheral device 251 may also be stored within the ODD services such as 231.

The ecosystem manageability sub-agent 290 of the anchor node information handling system 230 in an embodiment may retrieve the functional capabilities for the peripheral device 251 from the firmware 253 via communication with the ecosystem manageability interface 252, which may act as an application programming interface (API), for example, between the firmware 253 and the ecosystem manageability sub-agent 290. The anchor node information handling system 230 may gather the functional capabilities for the peripheral device 251 from the ODD service or firmware 253 via the ecosystem manageability interface 253, which may also act as an API between the ODD service for the peripheral device 251 and the ecosystem manageability sub-agent 290. The ecosystem manageability sub-agent 290 in an embodiment may gather this information from the various seamless workspace ecosystem maintenance interfaces 252, for example, upon each detection of operative coupling of the peripheral devices 251 and 254, respectively, with the anchor node information handling system 230, or upon an initial pairing. In an embodiment, the ecosystem manageability sub-agent 290 in an embodiment may transmit the gathered functional capabilities for the peripheral device 251 to the peripheral device workspace cloud orchestrator 280, via the network access point 271a and the integration gateway service 272. Although not shown in FIG. 2, the smart peripheral device 254 may further include internal components facilitating communication of telemetry measurements for the peripheral device 254 to the ecosystem manageability sub-agent 290.

A manifest listing the peripheral device nodes 230, 251 and 254 for a given peripheral device workspace 250 as location of a peripheral device workspace 250 may be combined with the peripheral device operational and environmental context telemetry readings for the peripheral device workspace 250 and an identification of the anchor node information handling system 230 user into a peripheral device workspace anchor node status update document written in a machine-readable language or machine markup language such as JavaScript Object Notation (JSON), for example, and transmitted for storage with the peripheral device workspace identification value at the peripheral device workspace management system database 287 via execution of code instructions of an ecosystem manageability service module 284 operating at the peripheral device workspace cloud orchestrator 280 in a cloud computing platform. Each time a peripheral device configuration setting is changed by the user, a new peripheral device is added to the peripheral device workspace, or changes to peripheral device operational and environmental context telemetry readings for the peripheral device workspace 250 is detected, a new peripheral device workspace anchor node status update document including this updated configuration may be transmitted to a user experience aware fleet sizing and workspace booking system 286 executing via the ecosystem manageability service module 284 of the peripheral device workspace cloud orchestrator 280 executing at a peripheral device workspace cloud orchestration server.

The anchor node information handling system 230 in an embodiment may be operatively connected to the internet via a network access point (AP) 271a, which may further connect to one or more cloud-based applications, servers, or systems. Such cloud-based applications in an embodiment may include a peripheral device workspace cloud orchestrator 280 and ecosystem manageability service module 284 executing at one or more peripheral device workspace cloud orchestrator servers which communicates with the remote anchor node information handling systems 230 in various peripheral device workspaces 250 and 260, respectively, via an integration gateway service 272 and one or more network APs 271a and 271b. The integration gateway service 272 in an embodiment may operate as an Application Programming Interface (API) or a Query Language (QL) supervisor to control communications to and from the peripheral device workspace cloud orchestrator 280, for example. More specifically, the integration gateway service 272 may, via an API, control the query language in which queries are made to the peripheral device workspace cloud orchestrator 280. As another example, the integration gateway service 272 may use a query language supervisor, such as GraphQL® to control such queries and the format in which results are provided by the peripheral device workspace cloud orchestrator 280. The anchor node information handling system 230 may communicate gathered peripheral device telemetry, as well as telemetry specific to the anchor node information handling system 230 itself, to the peripheral device workspace cloud orchestrator 280 and the ecosystem manageability service module 284 via this integration gateway service 271a.

Various peripheral device workspaces 250 or 260 such as the hybrid work office peripheral device workspaces and other peripheral device workspaces described herein may be defined by location indicator, from a GPS or from a network location in some embodiments, for a physical location detected for an anchor node information handling system 230 operating at the peripheral device workspace 250 or 260, and a manifest of nodes of peripheral devices such as

251 and 254 and smart devices that may operate in the peripheral device workspace 250 or 260. Each such defined peripheral device workspace such as 250 may also be assigned a peripheral device workspace identification value which may be stored and associated with stored manifests of nodes operating in the peripheral device workspace 250 at memory 287. Additional peripheral device operational and environmental context telemetry readings for the peripheral device workspace may be stored within one or more peripheral device workspace anchor node status update documents as well as included in the definition of the peripheral device workspace such as 250 and associated with its peripheral device workspace identification value defined at the peripheral device workspace cloud orchestrator server database 287, including peripheral device capabilities, peripheral device connectivity details, current peripheral device configurations or settings, peripheral device setting or configuration options, current status of the peripheral devices within the peripheral device workspace, and other features of nodes within the peripheral device workspace. For example, the definition of the peripheral device workspace 250 associated with a specific peripheral device workspace identification value may include a set of environmental context data and stored within one or more peripheral device workspace anchor node status update documents, such as time, applications currently executing or planned, connection type, hardware component capabilities or usage metrics, or environmental sensor readings (e.g., humidity, temperature), among other possible peripheral device operational and environmental context telemetry readings for an anchor node information handling system 230 operating within the defined peripheral device workspace 250.

A peripheral device workspace such as 250 may be defined by a location, a list of peripheral devices such as 251 and 254 operatively coupled to an anchor node information handling system 230 for a user, and additionally in some cases, by one or more of the peripheral device operational and environmental context telemetry readings for the peripheral device workspace 250 described herein. Each of these defining factors may be associated in memory 287 for the cloud manageability orchestration module 282 with the peripheral device workspace identification value, which may also be associated with one or more peripheral device operational configuration policies describing how the peripheral device nodes 251 and 254 within the defined peripheral device workspace 250 are to operate.

It is contemplated that each peripheral device workspace 250 or 260 may be at any locations worldwide in which a user connects an information handling system 230 as a primary or anchor node to one or more peripheral devices 251 or 254 as secondary nodes. In a further aspect, peripheral device workspace 250 or 260 may be in the same physical location, but may contain different groupings of an anchor node and one or more operatively coupled peripheral devices, as independent peripheral device workspaces or meshes within a single peripheral device workspace. In a still further aspect, peripheral device workspace 250 or 260 may be in the same or different physical locations and may share the same anchor node 230. In other words, peripheral device workspace 250 may be located at the user's office, peripheral device workspace 260 may be located at the user's home, and a single laptop 230 may operate as the anchor node in both peripheral device workspace 250 and peripheral device workspace 260 in one example embodiment. In another example embodiment, peripheral device workspace 250 and peripheral device workspace 260 may both be located at the user's office, and may include the same laptop anchor node 230, but peripheral device workspace 250 and peripheral device workspace 260 may include different groups of peripheral devices. This may be the case, for example, if the user routinely executes graphics intensive design applications and connects to a 4K high resolution display during the morning hours of each day, then switches to use of a webcam and execution of videoconferencing applications during the afternoon hours of each day. In yet other embodiments, a location for a peripheral device workspace 250 may include subsets of peripheral devices that may operate with an anchor information handling system 230 that are divided into meshes within the same peripheral device workspace 250.

The memory 287 for the peripheral device workspace management system may further store a user composite peripheral device workspace identifier that is unique to individual users of one or more defined peripheral device workspaces such as 250 or 260 that are associated with identification of the user of the user's information handling system 230 and peripheral device workspace identification values of the peripheral device workspaces such as 250 and 260 used by that user. Thus, a user composite peripheral device workspace identifier may identify a single user of an anchor node information handling system 230, and a peripheral device workspace identification value for each of one or more peripheral device workspaces 250 or 260 in which the user's information handling system 230 operates as an anchor node at various times. This user composite peripheral device workspace identifier and any experience identification values (xIDs) for configurations and settings in various peripheral device workspaces may be stored by peripheral device workspace cloud orchestrator 280 at a database 287. Similarly, peripheral device workspace identification values for peripheral device workspaces and related environmental context data may also be stored at the database 287 for reference by the peripheral device workspace cloud orchestrator 280. The user composite peripheral device workspace identifier may thus be user-specific and user-centric. The peripheral device workspace identification value, in comparison, may define a location and list of peripheral device nodes such as 251 and 254, and may thus be peripheral device workspace-centric. Each user composite peripheral device workspace identifier may be associated with a single user, and may further include one or more user experience fingerprints with a user experience identifier (xID) defining usage patterns or the ways in which the single user uses the anchor node information handling system 230 and one or more peripheral devices such as 251 and 254 within defined peripheral device workspaces such as 250 in which the single user operates.

A user experience fingerprint may include a list of peripheral device nodes such as 251 and 254 within a defined peripheral device workspace such as 250 associated with a peripheral device workspace identification value and the user's composite peripheral device workspace identifier, as well as capabilities for each of those listed peripheral devices 251 and 254, and at least one peripheral device operational and environmental context telemetry reading of the peripheral device workspace 250 describing a pattern of usage for the specific user of the anchor node information handling system 230. The user experience fingerprint may be used to link usage patterns for the anchor node information handling system 230 (e.g., execution of specific software applications or high usage rates for various hardware components at the anchor node) with the capabilities and settings for the operatively coupled peripheral devices within the peripheral device workspace 250. By determining this relationship, the types of peripheral devices such as 251 and 254, as defined by capabilities, as well as settings for those peripheral devices 251 and 254 that can meet the expected workload or future needs for that user may be also determined for peripheral device workspaces such as 250 and provide for one or more possible user experience categories at peripheral device workspace 250 depending on settings according to embodiments herein.

Code instructions for the user experience aware fleet sizing and workspace booking system 286 in an embodiment may execute to assign one of the defined user experience categories described in greater detail above with respect to FIG. 1 to each user Experience Identifier (xID) for each user. For example, the user of the anchor node 230 information handling system for the peripheral device workspace 250 may be associated with an xID describing the peripheral devices 251 and 254 and their peripheral device capabilities that have been sufficient in the past to handle the workload for the anchor node 230 while it is working within the peripheral device workspace 250. In some cases, the user for the anchor node 230 may also be associated with a second xID describing peripheral device capabilities that have been sufficient in the past to handle a separate workload for the anchor node 230 while it is working within the peripheral device workspace 260. Thus, a single user may be associated with a plurality of user experience identifiers. This process may be repeated for each user within an enterprise in an embodiment.

Such a user experience identifier in an embodiment may include a list of nodes, such as 230, 251, and 254 in any peripheral device workspace, such as 250, associated with an enterprise user composite peripheral device workspace identifier, capabilities of those nodes 230, 251, and 254, and at least one peripheral device operational and environmental context telemetry reading describing a specific user's pattern of usage for each node, including the anchor node 230. Each of these user experience categories in an embodiment may also be associated with minimum peripheral device capabilities, as described in greater detail in embodiments herein, such as above with respect to FIG. 1 and below with respect to FIG. 4. Code instructions for the user experience aware fleet sizing and workspace booking system 286 in an embodiment may operate to identify peripheral device capabilities required by a user experience category that match the capabilities for the peripheral device nodes within one of a user's xIDs stored in database 287 with a user composite peripheral device workspace identifier. Once such a match is found, the code instructions for the user experience aware fleet sizing and workspace booking system 286 may store the matching user experience category as part of that matching xID within the memory database 287.

Code instructions for the user experience aware fleet sizing and workspace booking system 286 in an embodiment may execute to determine a number of composite peripheral device workspace identifiers having xIDs that are associated with each defined user experience category. For example, code instructions for the user experience aware fleet sizing and workspace booking system 286 in an embodiment may determine 100 users, each associated with a separate user composite peripheral device workspace identifier have an xID associated with the gaming mode user experience category, and 250 users have an xID associated with the design and development mode user experience category or other type of workplace proficiency software user experience category. Upon determination of the number of user experience categories each of the users within an enterprise fall within, code instructions for the user experience aware fleet sizing and workspace booking system 286 may recommend setup of one peripheral device workspace meeting the minimum peripheral device capabilities requirements for a given user experience category to meet the user experience category for each xID, as described in greater detail below with respect to FIGS. 3 and 4. For example, in an embodiment in which 100 xIDs are associated with the gaming mode user experience category, and 250 xIDs are associated with the design and development mode user experience category or other type of workplace proficiency software user experience category, code instructions for the user experience aware fleet sizing and workspace booking system 286 may recommend setup of 100 peripheral device workspaces having peripheral device capabilities meeting the minimum requirements defined for the gaming mode user experience category and 250 peripheral device workspaces having peripheral device capabilities meeting the minimum requirements defined for the design and development mode user experience category or other type of workplace proficiency software user experience category.

The device manifest service 283 in an embodiment may access the received manifests of devices and peripheral device workspace anchor node status update documents stored within the peripheral device workspace management system database 287 to identify an inventory list of all peripheral devices managed by an enterprise that are available for setup according to the recommendations described directly above and below with respect to FIGS. 3 and 4. In some cases, such an inventory may indicate an insufficient number of peripheral devices of a certain type that are capable of meeting the minimum requirements for each of the peripheral device workspaces recommended for setup. For example, code instructions for the user experience aware fleet sizing and workspace booking system 286 may determine that an inventory that includes only 90 gaming mice with the minimum capabilities required for the gaming mode user experience category, where 100 of such mice are required for setup of the recommended 100 gaming mode peripheral device workspaces.

The range of functional capabilities for a plurality of peripheral devices (not shown) that are available for purchase via an online product purchase platform, for example, may be stored at device catalog database memory 285 in an embodiment. Model number, device number, media access control (MAC) address, or other identifying information for the peripheral devices available for purchase may also be stored within the device catalog database memory 285. When an insufficiency of peripheral devices within enterprise inventory to complete setup as recommended is identified, the device manifest service 283 in an embodiment may identify one or more peripheral devices available for purchase via an online product purchase platform and identified within the device catalog database memory 285 as having capabilities sufficient to meet the minimum requirements for inclusion within a peripheral device workspace setup for use according to a particular user experience category.

Figure 3:
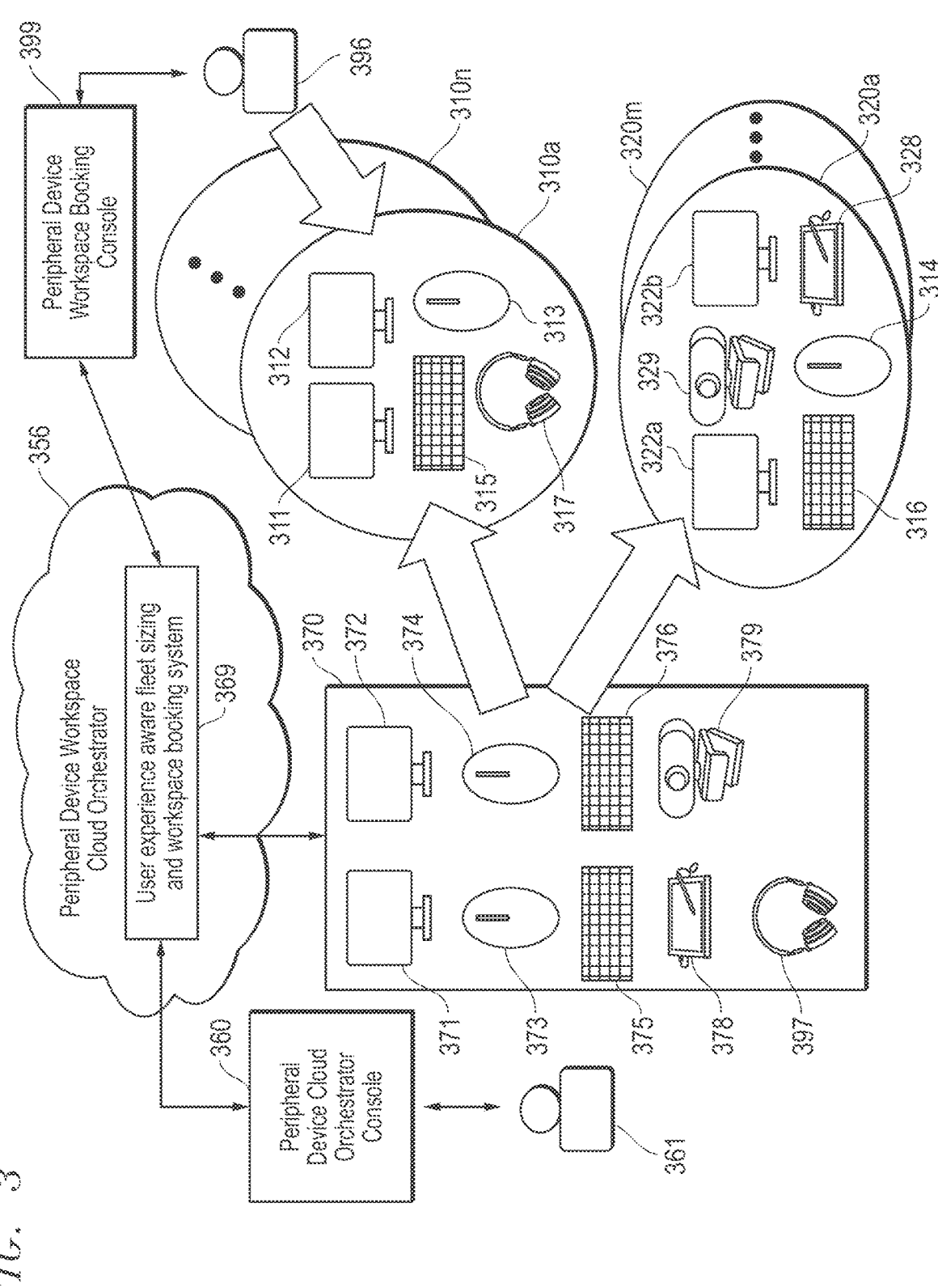
FIG. 3 is a block diagram illustrating a plurality of peripheral device workspaces, each set up to accommodate one of a plurality of user experience categories according to an embodiment of the present disclosure.

FIG. 3 is a block diagram illustrating a plurality of peripheral device workspaces, each set up from an inventory of available peripheral devices to accommodate one of a plurality of user experience categories according to an embodiment of the present disclosure. As described previously, upon determination of the number of user experience categories each of the users within an enterprise fall within in user composite peripheral device workspace identifier data, code instructions for the user experience aware fleet sizing and workspace booking system in an embodiment may recommend setup of one peripheral device workspace meeting the minimum peripheral device capabilities requirements for a given user experience category in each identified user experience identifier (xID). These user experience identifiers (xID) may be associated with a peripheral device usage pattern linking user workload and usage patterns at the anchor node information handling system for a given peripheral device workspace with specific types of peripheral devices and capabilities for those peripheral devices that the is capable of handling that specific user workload for a user experience category and a partially determined from user configuration and settings established previously for such user experience categories.

For example, code instructions for the user experience aware fleet sizing and workspace booking system 369 in an embodiment may determine 100 users, each associated with a separate user composite peripheral device workspace identifier have an xID associated with the gaming mode user experience category, and 250 users have an XID associated with the design and development mode user experience category or other type of workplace proficiency software user experience category. Upon determination of the number of user experience categories each of the users within an enterprise fall within, code instructions for the user experience aware fleet sizing and workspace booking system 369 may recommend setup of one peripheral device workspace meeting the minimum peripheral device capabilities requirements for a given user experience category to meet the user experience category for those corresponding xIDs among the users. For example, in an embodiment in which 100 xIDs are associated with the gaming mode user experience category, and 250 xIDs are associated with the design and development mode user experience category or other type of workplace proficiency software user experience category, code instructions for the user experience aware fleet sizing and workspace booking system 369 may recommend setup of 100 peripheral device workspaces (e.g., 310a to 310n, where n has a value of 100) having peripheral device capabilities meeting the minimum requirements defined for the gaming mode user experience category. As another example, code instructions for the user experience aware fleet sizing and workspace booking system 369 may recommend setup of 250 peripheral device workspaces (e.g., 320a to 320m, where m has a value of 250) having peripheral device capabilities meeting the minimum requirements defined for the design and development mode user experience category or other type of workplace proficiency software user experience category.

Code instructions for the user experience aware fleet sizing and workspace booking system 369 in an embodiment may also execute to define peripheral devices or peripheral device capabilities required for setup of a peripheral device workspace according to each defined user experience category. More specifically, in an embodiment in which gaming mode is a defined user experience category, as described above, code instructions of the user experience aware fleet sizing and workspace booking system 369 may execute to require minimum peripheral device capabilities for a peripheral device workspace 310a setup according to the gaming mode user experience category to include one or more of a high-resolution, programmable mouse 313, a keyboard 315 with anti-ghosting and N-key rollover capabilities, and colored backlighting, one or more high-frequency monitors 311 and 312, and a headset 317 with noise isolation capabilities. As another example, in an embodiment in which design and development mode is a defined user experience category, as described above, code instructions of the user experience aware fleet sizing and workspace booking system 369 may execute to require minimum peripheral device capabilities for the design and development mode to include a high-resolution monitor 322*a* and 322*b* with high-accuracy coloring as well as a keyboard 316, mouse 314, and stylus with trackpad 328 for input/output devices. In yet another example, in an embodiment in which meeting mode is a defined user experience category, code instructions of the user experience aware fleet sizing and workspace booking system 369 may execute to require a minimum threshold recording resolution for a webcam peripheral device 329, or a minimum sound quality threshold for an external speaker peripheral device. In example embodiments, any time a user experience category is defined, code instructions of the user experience aware fleet sizing and workspace booking system 369 may execute to require minimum peripheral device capabilities for the design and development mode to include features, settings, and configurations for peripheral device nodes to meet requirements of relevant software applications executing on an anchor information handling system node in a peripheral device workspace. By referencing these user experience categories associated with known users within the enterprise, code instructions of the user experience aware fleet sizing and workspace booking system 369 in an embodiment may thus execute to recommend set up of a certain number of peripheral device workspaces best suited for users operating in each of these user experience categories, as per the number of users associated with each category and user experience identifiers (xIDs) associated with those users and their user composite peripheral device workspace identifiers.

Code instructions for the user experience aware fleet sizing and workspace booking system 369 may also execute to determine when the current fleet of peripheral devices managed by the ITDM 361 via a peripheral device cloud orchestrator console 360 is insufficient to perform the recommended setup of user experience categories described directly above. For example, the device manifest service operating at the peripheral device workspace cloud orchestrator 356 in an embodiment may access the received manifests of devices and peripheral device workspace anchor node status update documents stored within the peripheral device workspace management system database to identify an inventory list 370 of all peripheral devices (e.g., 371, 372, 373, 374, 375, 376, 378, 379, and 397) managed by an enterprise that are available for setup according to the recommendations. In some cases, such an inventory may indicate an insufficient number of peripheral devices of a certain type that are capable of meeting the minimum requirements for each of the peripheral device workspaces recommended for setup in one or more user experience categories. For example, code instructions for the user experience aware fleet sizing and workspace booking system 369 may determine that an inventory that includes only 90 gaming mice (such as 373) with the minimum capabilities required for the gaming mode user experience category, where 100 of such mice are required for setup of the recommended 100 gaming mode peripheral device workspaces 310*a* to 310*n*.

As described in greater detail various embodiments herein such as with respect to FIG. 2, code instructions for the user experience aware fleet sizing and workspace booking system 369 in an embodiment in which the inventory 370 is insufficient to setup each of the recommended peripheral device workspaces 310*a* to 310*n* and 320*a* to 320*m* may execute to recommend purchase of new peripheral devices to overcome the identified inventory shortage based on required peripheral device capabilities for each user experience category. For example, the device manifest service operating at the peripheral device workspace cloud orchestrator 356 in an embodiment may identify one or more peripheral devices (e.g., gaming mice) available for purchase via an online product purchase platform and identified within the device catalog database memory as having capabilities sufficient to meet the minimum requirements for inclusion within a peripheral device workspace setup for use according to a particular user experience category.

Following set up of a plurality of peripheral device workspaces 310*a* to 310*n* and 320*a* to 320*m* by an ITDM according to the user experience aware fleet sizing and workspace booking system recommendations described above, users such as 396 may reserve peripheral device workspaces (e.g., from 310*a* to 310*n* and 320*a* to 320*m*) tailored to their specific needs, based on the user experience category in which the user 396 has identified they will be working, or in which it is estimated that the user 396 will be working and based on an xID for peripheral device usage patterns linking expected user workload and usage patterns at the user's anchor node information handling system with specific types of peripheral devices and their capabilities. Upon receiving a request, via the peripheral device workspace booking console 399 graphical user interface by a user 396 to reserve a peripheral device workspace for a particular time slot, the user experience aware fleet sizing and workspace booking system 369 may execute code instructions to determine the user experience category for the user's 396 xID, given within the user's unique user composite peripheral device workspace identifier. In some cases, a user's composite peripheral device workspace identifier may be associated with multiple user experience categories and multiple xIDs. In such a case, the user may specify one of these user experience categories for which the user is reserving the peripheral device workspace using the peripheral device workspace booking console 399. In other embodiments, code instructions for the user experience aware fleet sizing and workspace booking system 369 may rank each of the user's 396 user experience categories according to likelihood the user 396 will be operating in that user experience category, based at least in part on previous usage patterns for that user 396, access to calendar scheduling, or executing software applications or schedule execution of software applications by the user 396 as described in datasets of sessions associated with the users' composite peripheral device workspace identifier.

Code instructions for the user experience aware fleet sizing and workspace booking system 169 may then execute to identify one of the peripheral device workspaces 310*a* to 310*n* or 320*a* to 320*m*, such as 310*a*, set up by the ITDM with a user experience category such as gaming mode in which the requesting user 396 will be operating and that is available during the requested time slot and can meet the xID for the user 396. The user experience aware fleet sizing and workspace booking system 369 may execute code instructions to reserve the identified peripheral device workspace 310*a* with the best ranked matching user experience category for the user 396 and notify the user 396 via the peripheral device workspace booking agent console 399 of the reservation. Further matching may take place with respect to features, capabilities, and configuration settings available for nodes within peripheral device workspaces in a particular workspace user experience category as it matches xIDs indicating previous features, capabilities, configurations, and settings of the same used by a user 396 in previous sessions of an xID. In such a way, the user experience aware fleet sizing and workspace booking system 369 may tailor the assignment of users to specific peripheral device workspaces such as 310*a* to the users' needs.

FIG. 4 is a flow diagram illustrating a method of defining a plurality of user experience categories linking peripheral device workspace anchor node usage patterns and workloads with capabilities for peripheral devices within peripheral device workspaces that have previously handled such workloads according to an embodiment of the present disclosure. As described herein, code instructions for the peripheral device workspace management server may be executed to define one or more user experience categories based on, at a minimum, device capabilities for at least one peripheral device identified in the user experience fingerprint or xID, and at least one environmental context data measurement describing a pattern of usage or workload for the specific user of the anchor node information handling system in a peripheral device workspace. These user experience categories in an embodiment may then be used to further reconfigure a plurality of peripheral devices within an enterprise's inventory of available peripheral devices into a plurality of peripheral device workspaces, with each peripheral device workspace configured for use within one of the defined user experience categories.

At block 402, a peripheral device workspace anchor node in an embodiment may collect peripheral device operational and environmental context telemetry readings for the anchor information handling system node or other smart node and secondary node peripheral devices for a plurality of peripheral device workspaces over time. This may include a list of existing functional capabilities for each node in each of the existing peripheral device workspaces, where and when communication and retrieval of such environmental context telemetry is available. For example, as described in an embodiment with respect to FIG. 1, peripheral device operational and environmental context telemetry readings gathered pursuant to execution of code instructions for an ecosystem manageability sub-agent 172 in an embodiment may include, for example, information specific to the information handling system 100, or the operative connection between the information handling system 100 and the peripheral devices 142, when in one or another peripheral device workspace. More specifically, the peripheral device operational and environmental context telemetry readings gathered pursuant to execution of code instructions for the ecosystem manageability sub-agent may include, for the information handling system 100, a current power mode (e.g., sleep mode, battery mode, operational mode, powered down), range of possible power modes, current time, geographic location for the peripheral device workspace that includes the information handling system 100, current execution of a specific software application, hardware processor 102 or 104 utilization rate, memory 106, 108, or 120 utilization rate, remaining battery power for battery 124.

In another example embodiment described with respect to FIG. 2, code instructions for the ecosystem manageability sub-agent 290 in an embodiment may execute to gather, via an ecosystem manageability interface 252 at one or more secondary node peripheral devices, various peripheral device operational and environmental context telemetry readings describing operational capabilities for the one or more secondary node peripheral devices such as 251 within the peripheral device workspace 250. For example, the code instructions for the ecosystem manageability sub-agent 290 operating at the anchor node 230 may execute to gather peripheral device operational and environmental context telemetry readings regarding the range of capabilities for each peripheral device (e.g., 251 and 254). In the case where the peripheral device 251 has already been purchased and set up by the user within one of the peripheral devices workspaces, such as 250, the information defining the range of functional capabilities for the peripheral device 251 may be stored at the peripheral device 251, within the firmware 253. In another embodiment, in which a new peripheral device 291 is purchased by the user from the product purchase platform, which is in communication with and accessible or manageable by the peripheral device workspace cloud orchestrator 280, the range of functional capabilities for the peripheral device 291 may be stored at an orchestration device descriptor (ODD) service 292. In an embodiment, the ODD service 292 the peripheral device 291 may also store static or non-adjustable features for the peripheral device 291, such as locations for various ports, physical dimensions of the new peripheral device 291, or physical locations for internal components such as an embedded camera. Model number, device number, media access control (MAC) address, or other identifying information for the peripheral device 291 may also be stored within the ODD service 292, while similar identifying information for the peripheral device 251 in an embodiment may be stored within firmware 253. The ecosystem manageability sub-agent 290 of the anchor node information handling system 230 may execute code instructions in an embodiment to retrieve the functional capabilities for the peripheral device 251 from the firmware 253 via communication with the ecosystem manageability interface 252, which may act as an application programming interface (API), for example, between the firmware 253 and the ecosystem manageability sub-agent 290. The ODD may include a unique peripheral device identification as well as an environmental telemetry data set describing the peripheral device operational and environmental context telemetry readings regarding the range of capabilities for each peripheral device (e.g., 251 and 254).

The peripheral device workspace anchor node in an embodiment may generate and transmit to the cloud manageability orchestrator module a peripheral device workspace anchor node status update document including manifest of peripheral devices in peripheral device workspace and collected peripheral device operation and environmental context telemetry readings for a peripheral device workspace location identified by a location identifier. For example, in an embodiment described with respect to FIG. 1, code instructions for the ecosystem manageability sub-agent 172 executing at the information handling system 100 in a peripheral device workspace may create a manifest of peripheral device nodes 142 and other nodes for a peripheral device workspace identification value to represent the current peripheral device workspace, including an identification of the user, and an identification (e.g., by product serial number or other peripheral device identification) of each of the peripheral device nodes 142 connected to or operably coupled to the anchor information handling system 100 at a peripheral device workspace.

The hardware processor 102 of the user anchor information handling system 100 may execute code instructions of the ecosystem manageability sub-agent 172 to also collect one or more peripheral device operational and environmental context telemetry readings (e.g., time, applications executing, hardware component usage metrics, or other telemetry data indicating usage patterns for the information handling system 100 or various peripheral devices 142 in a peripheral device workspace). The manifest of peripheral device nodes and other nodes as well as location of a peripheral device workspace described above may be combined with the peripheral device operational and environmental context telemetry readings for the peripheral device workspace and an identification of the anchor node information handling system 100 user into a peripheral device workspace anchor node status update document written in a machine-readable language or machine markup language such as JavaScript Object Notation (JSON), for example, to be associated with a peripheral device workspace identification value.

This peripheral device workspace anchor node status update document is transmitted for storage with the peripheral device workspace identification value at a peripheral device workspace management system database 167 operating in the peripheral device workspace cloud orchestrator 156. Each time a peripheral device configuration setting is changed by the user, a new peripheral device is added to the peripheral device workspace, or changes to environmental context data for the peripheral device workspace are detected, a new peripheral device workspace anchor node status update document including this updated configuration may be transmitted to the peripheral device workspace cloud orchestrator 156 for association with the peripheral device workspace identification value for the peripheral device workspace. Additionally, values for the ODD of each peripheral device in the manifest of peripheral devices in the peripheral device workspace may also be updated with these changes. Similarly, a given set of configuration settings operated by a user for a period of time may establish an xID for the user's user composite peripheral device workspace identifier to record usages of the peripheral devices by a user in a peripheral device workspace.

Code instructions for the user experience aware fleet sizing and workspace booking system in an embodiment at block 404 may execute to determine a plurality of user experience categories in which each of the plurality of peripheral device workspaces may operate, as defined by the types of peripheral devices and capabilities for those devices within each peripheral device workspace. For example, in an embodiment described with respect to FIG. 1, the peripheral device workspace management server 158 may execute code instructions of the user experience aware fleet sizing and workspace booking system 169 to automatically associate each user experience fingerprint for an xID with one of a plurality of user experience categories. These user experience categories may broadly define the ways in which the user of the anchor node information handling system 100 for a given peripheral device workspace uses the anchor node 100 and each of the peripheral devices 142 operatively coupled therewith during execution of certain workloads. It is contemplated that a peripheral device workspace may have capabilities or a plurality of peripheral device nodes to accommodate more than one user experience categories in some embodiments depending on how settings are adjusted or which peripheral device nodes are engaged. Code instructions for the peripheral device workspace management server 158 may be executed to define one or more user experience categories based on, at a minimum, device capabilities for at least one peripheral device 142 identified in the user experience fingerprint, and at least one environmental context data measurement describing a pattern of usage or workload for the specific user of the anchor node information handling system 100 in a peripheral device workspace.

In some cases, usage patterns for determining user experience categories may be gleaned from analysis of the hardware capabilities and hardware component usage metrics for various hardware components (e.g., 102, 104, 106, 108, 120, or 154) at the anchor node information handling system 100. For example, an anchor node information handling system 100 executing gaming applications may have capabilities and generate different hardware component usage metrics than an anchor node information handling system 100 executing design and development applications. More specifically, an anchor node information handling system 100 executing gaming applications may have a high-end graphics process unit (GPU) 154, a relatively large amount of solid state disk (SSD) 120 storage, or a high-powered fan or other cooling system 198, and may produce hardware component usage metrics indicating a percentile capacity usage value greater than a threshold value, such as 90% for example, for GPU 154 or for a hard disk drive (HDD) 104 read/write (RW) capacity. These capabilities and hardware component usage metrics may thus, for example, be associated with or define a gaming user experience category. As another example embodiment, an anchor node information handling system 100 executing design and development applications may be a graphics tablet with an operating system 116 most often used by design and development employees with an accompanying stylus peripheral device 148, and may produce hardware component usage metrics indicating a percentile capacity usage value greater than a threshold value, for a CPU 102. These capabilities and hardware component usage metrics for an anchor node information handling system 100 may thus, for example, be associated with or define a design and development user experience category or other type of workplace proficiency software user experience category. As yet another example embodiment, an anchor node information handling system 100 may be executing a videoconferencing application, which may define a meeting mode and require connectivity configuration requirements, such as bandwidth, of a network interface device.

The user experience categories may also be defined by one or more peripheral device capabilities describing the capabilities of the peripheral devices 142 operatively coupled to the anchor node information handling system 100 at the time that the above described anchor node hardware component capabilities and usage metrics are recorded. For example, at the time that the above described anchor node hardware component capabilities and usage metrics associated with the gaming user experience category are recorded within a peripheral device workspace anchor node status update document as described above, the anchor node 100 may be operatively coupled to a high-resolution, programmable mouse 152, a keyboard 146 with anti-ghosting and N-key rollover capabilities, and colored backlighting, a high-frequency monitor 144, and a headset 153 with noise isolation capabilities. One or more of these peripheral device capabilities may thus be used to define a gaming user experience category. As another example, at the time that the above described anchor node hardware component capabilities and usage metrics associated with the design and development user experience category or other type of workplace proficiency software user experience category are recorded, the anchor node 100 may be operatively coupled to a high-resolution monitor with high-accuracy coloring. One or more of these peripheral device capabilities may thus be used to define a design and development user experience category or other type of workplace proficiency software user experience category. As yet another example, an anchor node information handling system 100 executing a videoconferencing application may have a minimum threshold recording resolution for a webcam peripheral device, or a minimum sound quality threshold for an external speaker peripheral device. In such a way, the user experience identifier (xID) may be associated with a peripheral device usage pattern linking user workload and usage patterns at the anchor node information handling system 100 with specific types of peripheral devices 142 and capabilities for those peripheral devices 142 that the user views as capable of handling that specific user workload for a user experience category.

At block 406, code instructions for the user experience aware fleet sizing and workspace booking system may execute to assign one of the defined user experience categories to each user experience identifier (xID) for user composite peripheral device workspace identifiers for users in an enterprise. Such a user experience identifier in an embodiment may include a list of nodes in any peripheral device workspace associated with an enterprise user composite peripheral device workspace identifier, capabilities of those nodes, and at least one peripheral device operational and environmental context telemetry reading describing a specific user's pattern of usage for each node. For example, in an embodiment described with reference to FIG. 2, code instructions for the user experience aware fleet sizing and workspace booking system 286 in an embodiment may execute to assign one of the defined user experience categories. Assignment of the defined user experience categories is described in greater detail in embodiments herein such as with respect to FIG. 1 to each user Experience Identifier (xID) for each user. For example, the user of the anchor node 230 information handling system for the peripheral device workspace 250 may be associated with an XID describing the peripheral devices 251 and 254 and their peripheral device capabilities and settings that have been sufficient in the past to handle the workload for the anchor node 230 while it is working within the peripheral device workspace 250. In some cases, the user for the anchor node 230 may also be associated with a second xID describing peripheral device capabilities that have been sufficient in the past to handle a separate workload for the anchor node 230 while it is working within the peripheral device workspace 260. Thus, a single user may be associated with a plurality of user experience identifiers.

Such a user experience identifier in an embodiment may include a list of nodes, such as 230, 251, and 254 from FIG. 2 in any peripheral device workspace, such as 250, associated with an enterprise user composite peripheral device workspace identifier, capabilities of those nodes 230, 251, and 254, and at least one peripheral device operational and environmental context telemetry reading describing a specific user's pattern of usage for each node, including the anchor node 230. Each of these user experience categories in an embodiment may also be associated with minimum peripheral device capabilities according to embodiments herein. Code instructions for the user experience aware fleet sizing and workspace booking system 286 in an embodiment may operate to identify peripheral device capabilities required by a user experience category that match the capabilities for the peripheral device nodes within one of a user's xIDs. Once such a match is found, the code instructions for the user experience aware fleet sizing and workspace booking system 286 may store the matching user experience category as part of that matching xID within the memory 287.

Code instructions for the user experience aware fleet sizing and workspace booking system may execute to define or an ITDM may define peripheral devices or peripheral device capabilities required for setup of each defined user experience category at block 408. For example, in an embodiment described with reference to FIG. 1, code instructions for the user experience aware fleet sizing and workspace booking system 169 in an embodiment may also execute to define peripheral devices or peripheral device capabilities required for setup of a peripheral device workspace according to each defined user experience category. For example, the user experience aware fleet sizing and workspace booking system 169 may execute code instructions to require any given peripheral device workspace that is setup for a given user experience category to include peripheral devices, such as those in 142, that have the peripheral device functional capabilities that define that user experience category. More specifically, in an embodiment in which gaming mode is a defined user experience category, as described above, code instructions of the user experience aware fleet sizing and workspace booking system 169 may execute to require minimum peripheral device capabilities for the gaming mode to include one or more of a high-resolution, programmable mouse 152, a keyboard 146 with anti-ghosting and N-key rollover capabilities, and colored backlighting, a high-frequency monitor 144, and a headset 153 with noise isolation capabilities. As another example, in an embodiment in which design and development mode or other type of workplace proficiency software mode is a defined user experience category, as described above, code instructions of the user experience aware fleet sizing and workspace booking system 169 may execute to require minimum peripheral device capabilities for the design and development mode or other type of workplace proficiency software mode to include a high-resolution monitor with high-accuracy coloring or another peripheral device feature or capability to meet the software application executing for the identified user experience category. In yet another example, in an embodiment in which meeting mode is a defined user experience category, as described above, code instructions of the user experience aware fleet sizing and workspace booking system 169 may execute to require a minimum threshold recording resolution for a webcam peripheral device, or a minimum sound quality threshold for an external speaker peripheral device. It is appreciated that a plurality of features, capabilities, configurations, or settings are contemplated to be determined for the user experience category at the peripheral device workspaces by the peripheral device workspace cloud orchestrator according to embodiments herein.

In some embodiments, these require peripheral device capabilities may be auto-populated through execution of code instructions for the user experience aware fleet sizing and workspace booking system 169. For example, enterprise users with xIDs that correspond to user experience categories for peripheral device workspaces used by those users may determine from selection of peripheral devices and configurations and settings for those peripheral device nodes during a usage activity may determine, in part, selection of peripheral device nodes and capabilities and configurations that need to be available to meet a user experience category in an embodiment. In other embodiments, the ITDM for the enterprise may be prompted to select one or more of these peripheral device capabilities defining the user experience categories as minimum requirements for each peripheral device workspaces setup to accommodate those user experience categories. For example, the ITDM may select one or more of the above-listed peripheral device capabilities for the gaming mode, the design and development mode, the meeting mode, or other type of workplace proficiency software mode via the peripheral device workspace cloud orchestrator console 160 graphical user interface.

At block 410, code instructions for the user experience aware fleet sizing and workspace booking system in an embodiment may execute to determine a number of composite peripheral device workspace identifiers having xIDs that are associated with each defined user experience category. For example, in an embodiment described with reference to FIG. 2, code instructions for the user experience aware fleet sizing and workspace booking system 286 in an embodiment may execute to determine a number of composite peripheral device workspace identifiers having xIDs that are associated with each defined user experience category. For example, code instructions for the user experience aware fleet sizing and workspace booking system 287 in an embodiment may determine 100 users, each associated with a separate user composite peripheral device workspace identifier have an xID associated with the gaming mode user experience category, and 250 users have an xID associated with the design and development mode user experience category or other type of workplace proficiency software user experience category. Upon determination of the number of user experience categories each of the users within an enterprise fall within, code instructions for the user experience aware fleet sizing and workspace booking system 286 may recommend setup of one peripheral device workspace meeting the minimum peripheral device capabilities requirements for a given user experience category to meet the user experience category for each xID, as described in greater detail below with respect to FIGS. 3 and 4. For example, in an embodiment in which 100 xIDs are associated with the gaming mode user experience category, and 250 xIDs are associated with the design and development mode user experience category or other type of workplace proficiency software user experience category, code instructions for the user experience aware fleet sizing and workspace booking system 286 may recommend setup of 100 peripheral device workspaces having peripheral device capabilities meeting the minimum requirements defined for the gaming mode user experience category and 250 peripheral device workspaces having peripheral device capabilities meeting the minimum requirements defined for the design and development mode user experience category or other type of workplace proficiency software user experience category.

In an embodiment at block 412, code instructions for the user experience aware fleet sizing and workspace booking system may execute to recommend that the ITDM set up a peripheral device workspaces for each of the user experience categories based on the determined number of enterprise users associated with each defined user experience category. For example, in an embodiment described with reference to FIG. 3, code instructions for the user experience aware fleet sizing and workspace booking system 369 in an embodiment may determine 100 users, each associated with a separate user composite peripheral device workspace identifier have an xID associated with the gaming mode user experience category, and 250 users have an xID associated with the design and development mode user experience category or other type of workplace proficiency software user experience category. Upon determination of the number of user experience categories each of the users within an enterprise fall within, code instructions for the user experience aware fleet sizing and workspace booking system 369 may recommend setup of one peripheral device workspace meeting the minimum peripheral device capabilities requirements for a given user experience category to meet the user experience category for each xID. For example, in an embodiment in which 100 xIDs are associated with the gaming mode user experience category, and 250 xIDs are associated with the design and development mode user experience category or other type of workplace proficiency software user experience category, code instructions for the user experience aware fleet sizing and workspace booking system 369 may recommend setup of 100 peripheral device workspaces (e.g., 310a to 310n, where n has a value of 100) having peripheral device capabilities meeting the minimum requirements defined for the gaming mode user experience category. As another example, code instructions for the user experience aware fleet sizing and workspace booking system 369 may recommend setup of 250 peripheral device workspaces (e.g., 320a to 320m, where m has a value of 250) having peripheral device capabilities meeting the minimum requirements defined for the design and development mode user experience category or other type of workplace proficiency software user experience category.

In an embodiment in which gaming mode is a defined user experience category, as described above, code instructions of the user experience aware fleet sizing and workspace booking system 369 may execute to require minimum peripheral device capabilities for the a peripheral device workspace 310a setup according to the gaming mode user experience category to include one or more of a high-resolution, programmable mouse 313, a keyboard 315 with anti-ghosting and N-key rollover capabilities, and colored backlighting, a high-frequency monitor 311, and a headset 317 with noise isolation capabilities. As another example, in an embodiment in which design and development mode is a defined user experience category, as described above, code instructions of the user experience aware fleet sizing and workspace booking system 369 may execute to require minimum peripheral device capabilities for the design and development mode to include a high-resolution monitor 322a and 322b with high-accuracy coloring. In yet another example, in an embodiment in which meeting mode is a defined user experience category, code instructions of the user experience aware fleet sizing and workspace booking system 369 may execute to require a minimum threshold recording resolution for a webcam peripheral device 329, or a minimum sound quality threshold for an external speaker peripheral device.

At block 414, code instructions for the user experience aware fleet sizing and workspace booking system may execute to determine whether the peripheral devices currently listed as available in the enterprise inventory are sufficient to set up each of the number of peripheral device workspaces recommended for set up at block 412. For example, in an embodiment described with respect to FIG. 2, the device manifest service 283 in an embodiment may access the received manifests of devices and peripheral device workspace anchor node status update documents stored within the peripheral device workspace management system database 287 to identify an inventory list of all peripheral devices managed by an enterprise that are available for setup with configurations and settings according to the recommendations. In some cases, such an inventory may indicate an insufficient number of peripheral devices of a certain type that are capable of meeting the minimum requirements for each of the peripheral device workspaces recommended for setup. For example, code instructions for the user experience aware fleet sizing and workspace booking system 286 may determine that an inventory that includes only 90 gaming mice with the minimum capabilities required for the gaming mode user experience category, where 100 of such mice are required for setup of the recommended 100 gaming mode peripheral device workspaces.

As another example described with reference to FIG. 3, the device manifest service operating at the peripheral device workspace cloud orchestrator 356 in an embodiment may access the received manifests of devices and peripheral device workspace anchor node status update documents stored within the peripheral device workspace management system database to identify an inventory list 370 of all peripheral devices (e.g., 371, 372, 373, 374, 375, 376, 378, 379, and 397) managed by an enterprise that are available for setup according to the recommendations. In some cases, such an inventory may indicate an insufficient number of peripheral devices of a certain type that are capable of meeting the minimum requirements for each of the peripheral device workspaces recommended for setup. For example, code instructions for the user experience aware fleet sizing and workspace booking system 369 may determine that an inventory that includes only 90 gaming mice (such as 373) with the minimum capabilities required for the gaming mode user experience category, where 100 of such mice are required for setup of the recommended 100 gaming mode peripheral device workspaces 310*a* to 310*n*.

If the current inventory is not sufficient to allow the ITDM to setup each of the recommended peripheral device workspaces according to defined user experience categories, the method may proceed to block 416 for recommended purchase of needed peripheral devices. If the current inventory is sufficient to allow the ITDM to set up each of the recommended peripheral device workspaces according to defined user experience categories, there may be no need to purchase new peripheral devices for such a setup, and the method for defining a plurality of user experience categories linking peripheral device workspace anchor node usage patterns and workloads with capabilities for peripheral devices within peripheral device workspaces that have previously handled such workloads may then end.

Code instructions for the user experience aware fleet sizing and workspace booking system in an embodiment at block 416 may execute to recommend purchase of new peripheral devices to overcome the identified inventory shortage based on required peripheral device capabilities for each user experience category. The range of functional capabilities for a plurality of peripheral devices that are available for purchase via an online product purchase platform, for example, may be stored at device catalog database memory 285 in an embodiment. Model number, device number, media access control (MAC) address, or other identifying information for the peripheral devices available for purchase may also be stored within the device catalog database memory 285. When an insufficiency of peripheral devices within enterprise inventory to complete setup as recommended is identified, the device manifest service 283 in an embodiment may identify one or more peripheral devices available for purchase via an online product purchase platform and identified within the device catalog database memory 285 as having capabilities sufficient to meet the minimum requirements for inclusion within a peripheral device workspace setup for use according to a particular user experience category.

In such a way, code instructions of the user experience aware fleet sizing and workspace booking system may execute to recommend setup by an ITDM of a plurality peripheral device workspaces for specific user experience categories to tailor the capabilities of the peripheral devices within such peripheral device workspaces to the expected workloads of users for those peripheral device workspaces. The method of defining a plurality of user experience categories linking peripheral device workspace anchor node usage patterns and workloads with capabilities for peripheral devices within peripheral device workspaces that have previously handled such workloads may then end.

FIG. 5 is a flow diagram illustrating a method of tailoring the assignment of users requesting access to a peripheral device workspace during a specific time slot to the specific peripheral device workspace setup according to a specific user experience category that will satisfy the users' needs according to an embodiment of the present disclosure. As described herein, following set up of a plurality of peripheral device workspaces by an ITDM according to the user experience aware fleet sizing and workspace booking system recommendations described above with respect to FIG. 4, users may reserve peripheral device workspaces tailored to their specific needs. This tailoring process may be based on the user experience category in which the user has identified they will be working, or in which it is estimated that the user will be working from indications determined from a calendar or software applications intending to be executed and an experience identifier (xID) for peripheral device usage patterns linking expected user workload and usage patterns at the user's anchor node information handling system with specific types of peripheral devices and their capabilities.

At block 502, an enterprise user in an embodiment may enter a reservation time and user composite peripheral device workspace identifier for reservation of a peripheral device workspace. For example, in an embodiment described with reference to FIG. 1, the peripheral device workspace booking console 199 graphical user interface, on a user's anchor information handling system 100 for example or on a remote information handling system, may be used by a peripheral device workspace user attempting to reserve an available peripheral device workspace managed by the ITDM. In such an embodiment, the reserving user may use the peripheral device workspace booking console 199 graphical user interface to enter a reservation time and the user composite peripheral device workspace identifier for the user may be determined from user identification or a user's anchor information handling system 100 to reserve a peripheral device workspace for that user.

The code instructions for the user experience aware fleet sizing and workspace booking system in an embodiment at block 504 may retrieve user experience identifiers (xIDs) describing reserving user's specific pattern of usage for each node in user's previously used peripheral device workspaces identified within user composite peripheral device workspace identifier. As also described with reference to FIG. 1, the peripheral device workspace management system database 167 may store a user composite peripheral device workspace identifier that is unique to individual users of one or more defined peripheral device workspaces that are associated with identification of the user of the user's information handling system 100. The user composite peripheral device workspace identifier for a user further includes the peripheral device workspace identification values of the peripheral device workspaces used by that user during various usage sessions. Each user composite peripheral device workspace identifier may be associated with a single user, and may further include one or more user experience fingerprints having a user experience identifier (xID) defining usage patterns or the ways in which the single user uses the anchor node information handling system and one or more peripheral devices within defined peripheral device workspaces in which the single user operates. A user experience fingerprint may include a list of peripheral device nodes within a defined peripheral device workspace associated with a peripheral device workspace identification value and the user's composite peripheral device workspace identifier, as well as capabilities for each of those listed peripheral devices, and at least one peripheral device operational and environmental context telemetry readings of the peripheral device workspace describing a pattern of usage for the specific user of the anchor node information handling system 100. The user experience fingerprint may be used to link usage patterns for the anchor node information handling system 100 (e.g., execution of specific software applications or high usage rates for various hardware components such as 102, 104, 106, 108, 120, or 154 at the anchor node 100 or of certain peripheral device nodes in a peripheral device workspace) with the capabilities and settings for the operatively coupled peripheral devices 142 within the peripheral device workspace.

At block 506, code instructions for the user experience aware fleet sizing and workspace booking system may execute in an embodiment to determine whether the requesting user is associated with a plurality of xIDs. As described herein, a user may be associated with a plurality of different peripheral device workspaces in which the user uses different sets of peripheral devices such as 142 to accommodate different workloads. As such, a user may be associated with a plurality of xIDs, with each one linking a different set of peripheral devices such as 142 within different peripheral device workspaces with different workloads that the user routinely executes. As also described herein with respect to block 406 of FIG. 4, the user experience aware fleet sizing and workspace booking system may have assigned one of the defined user experience categories to each xID. Thus, the user may be associated with multiple xIDs, with each xID being associated with a different user experience category. If the requesting user is associated with a plurality of user experience categories, the method may proceed to block 508 to prompt the user to identify which of those user experience categories they will likely be working in during the requested time slot. If the requesting user is associated with a plurality of user experience categories, there may be no need for such user clarification, and the method may proceed to block 510 for identification and reservation of a peripheral device workspace matching the user's user experience category for the requested time slot.

In an embodiment in which the user is associated with a plurality of xIDs, at block 508 in an embodiment, code instructions for the user experience aware fleet sizing and workspace booking system may execute to prompt the user to identify which of the user experience categories apply to the requested booking. For example, in an embodiment described with reference to FIG. 1, the user experience aware fleet sizing and workspace booking system 169 may display each of the user experience categories identified as associated with the user's xIDs at block 506 above to the user via the peripheral device workspace booking console 199 graphical user interface on, for example, the user's anchor information handling system 100 or another remote information handling system. The user may then use the peripheral device workspace booking console 199 graphical user interface in such an embodiment to select one of the displayed user experience categories. In other embodiments, a calendar access may be available indicating a video conference or time allotted for design efforts or usage of another workplace proficiency software in example embodiments to indicate the type of user activity that may fall under a user experience category. In yet other embodiments, scheduled or intended software applications to be executed by a user or time of day, day of week, or location (e.g., work office location peripheral device workspace during working hours on a weekday for design application activity) may be used to determine or preliminarily indicate an xID to be selected for the user. In some embodiments, the peripheral device workspace booking console 199 graphical user interface may be used to seek confirmation from the user.

At block 510, the user experience aware fleet sizing and workspace booking system may execute code instructions to identify and reserve a peripheral device workspace associated with the identified user experience category available during the requested reservation time. For example, in an embodiment described with reference to FIG. 3, users such as 396 may reserve peripheral device workspaces (e.g., from 310a to 310n and 320a to 320m) tailored to their specific needs, based on the user experience category in which the user 396 has identified they will be working, or in which it is estimated that the user 396 will be working and based on an xID for peripheral device usage patterns linking expected user workload and usage patterns at the user's anchor node information handling system with specific types of peripheral devices and their capabilities. Upon receiving a request, via the peripheral device workspace booking console 399 by a user 396 to reserve a peripheral device workspace for a particular time slot, the user experience aware fleet sizing and workspace booking system 369 may execute code instructions to determine the user experience category for the user's 396 xID, given within the user's unique user composite peripheral device workspace identifier. In some cases, a user's composite peripheral device workspace identifier may be associated with multiple user experience categories and multiple xIDs. In such a case, the user may specify one of these user experience categories for which the user is reserving the peripheral device workspace using the peripheral device workspace booking console 399 graphical user interface. In other embodiments, code instructions for the user experience aware fleet sizing and workspace booking system 369 may rank each of the user's 396 user experience categories according to likelihood the user 396 will be operating in that user experience category, based at least in part on previous usage patterns for that user 396, pending software applications to be executed, or access to calendar scheduling, as described in datasets of sessions associated with the users' composite peripheral device workspace identifier.

Code instructions for the user experience aware fleet sizing and workspace booking system 169 may then execute to identify one of the peripheral device workspaces 310a to 310n or 320a to 320m, such as 310a, set up by the ITDM with a user experience category such as gaming mode in which the requesting user 396 will be operating and that is available during the requested time slot and can meet the xID for the user 396. The fleet sizing and workspace booking system 369 may execute code instructions to reserve the identified peripheral device workspace 310a with the best ranked matching user experience category for the user 396 based on user's xID. In some embodiments, capabilities and configurations may be further considered for matching and selection among plural identified peripheral device workspaces 310a with the matching user experience category to further tailor a select identified peripheral device workspace 310a based on a user's previous xID in their user composite peripheral device workspace identifier. In such a way, the user experience aware fleet sizing and workspace booking system 369 may tailor the assignment of users to specific peripheral device workspaces such as 310a to the users' needs.

The code instructions for the user experience aware fleet sizing and workspace booking system in an embodiment at block 512 may execute to notify the requesting user of the reservation for the peripheral device workspaces associated with the identified user experience category during the requested reservation time. For example, in an embodiment described with respect to FIG. 1, upon determination by the user experience aware fleet sizing and workspace booking system 169 of an available peripheral device workspace having a user experience category matching the expected workload for the requesting user in an embodiment, the peripheral device workspace booking console 199 graphical user interface may also display instructions for the user to occupy the peripheral device workspaces selected by the user experience aware fleet sizing and workspace booking system 169. In such a way, the user experience aware fleet sizing and workspace booking system may tailor the assignment of users to specific peripheral device workspaces to the users' needs. The method for tailoring the assignment of users requesting access to a peripheral device workspace during a specific time slot to the specific peripheral device workspace setup according to a specific user experience category that will satisfy the users' needs may then end.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A peripheral device workspace cloud orchestrator executing at a cloud-based information handling system comprising:
    a hardware processor executing code instructions of the peripheral device workspace cloud orchestrator to define one of a plurality of user experience categories for an existing peripheral device workspace identified by a peripheral device workspace identification value and defined by a manifest of a plurality of peripheral devices at an identified location that have been previously operatively coupled to one of a plurality of user information handling systems acting as an anchor node for the existing peripheral device workspace, wherein each of the plurality of user experience categories includes at least one type of peripheral device workspace operational and environmental context telemetry reading describing a user workload pattern for an anchor information handling system node of the existing peripheral device workspace and a combination of peripheral device functional capabilities for each of the plurality of peripheral devices in the existing peripheral device workspace for handling execution of the user workload pattern for the anchor information handling system node; and
    the hardware processor executing code instructions to determine, for each of the plurality of user experience categories, the peripheral devices to be included in each of a plurality of peripheral device workspaces for each of the plurality of user experience categories needed to handle execution of a plurality of user workload patterns within an enterprise for a plurality of enterprise users based on previously received peripheral device workspace operational and environmental context telemetry measurements for each of the plurality of user information handling systems.

2. The peripheral device workspace cloud orchestrator of claim 1, wherein the user experience category is a gaming mode and the at least one type of peripheral device workspace operational and environmental context telemetry reading is a graphics processing unit (GPU) usage rate exceeding a threshold GPU usage value.

3. The peripheral device workspace cloud orchestrator of claim 1, wherein the user experience category is a gaming mode and the at least one type of peripheral device workspace operational and environmental context telemetry reading is a solid state disk (SSD) usage rate exceeding a threshold SSD usage value.

4. The peripheral device workspace cloud orchestrator of claim 1, wherein the user experience category is a design development mode and the at least one type of peripheral device workspace operational and environmental context telemetry reading is a central processing unit (CPU) usage rate exceeding a threshold CPU usage value.

5. The peripheral device workspace cloud orchestrator of claim 1, wherein the user experience category is a design development mode and the at least one type of peripheral device workspace operational and environmental context telemetry reading is a random access memory (RAM) usage rate exceeding a threshold RAM usage value.

6. The peripheral device workspace cloud orchestrator of claim 1, wherein the user experience category is a meeting mode and the at least one type of peripheral device workspace operational and environmental context telemetry reading includes execution of a videoconference software application.

7. The peripheral device workspace cloud orchestrator of claim 1 further comprising:
    the hardware processor executing code instructions to determine that an insufficient number of peripheral devices having the combination of peripheral device functional capabilities defining one of the plurality of user experience categories are listed in inventory for an enterprise to setup the number of configured peripheral device workspaces needed to handle execution of the plurality of user workload patterns for the plurality of enterprise users of the one of the plurality of user experience categories; and the hardware processor executing code instructions to recommend purchase by the ITDM of a peripheral device having the combination of peripheral device functional capabilities defining the one of the plurality of user experience categories.

8. A method of reconfiguring existing peripheral device workspaces to accommodate monitored user workloads comprising:

defining, via a hardware processor executing code instructions, one of a plurality of user experience categories for an existing peripheral device workspace identified by a peripheral device workspace identification value and defined by a manifest of a plurality of peripheral devices at an identified location that have been previously operatively coupled to one of a plurality of user information handling systems acting as an anchor information handling system node for the existing peripheral device workspace, wherein each of the plurality of user experience categories includes at least one type of peripheral device workspace operational and environmental context telemetry reading describing a user workload pattern for the anchor information handling system node of the existing peripheral device workspace and a combination of peripheral device functional capabilities for each of the plurality of peripheral devices in the existing peripheral device workspace for handling execution of the user workload pattern for the anchor information handling system node; and identifying peripheral devices for including in configured peripheral device workspaces in the user experience categories, via a hardware processor executing code instructions, for transmission to an information technology decision maker (ITDM) to designate each of the plurality of user experience categories that includes a number of the configured peripheral device workspaces needed to handle execution of a plurality of user workload patterns for a plurality of enterprise users based on previously received peripheral device workspace operational and environmental context telemetry measurements for automatic reservation assignment of the configured peripheral device workspace to each of the plurality of user information handling systems for those plurality of enterprise users in an enterprise in response to a request by an enterprise user and current telemetry data for the enterprise user.

9. The method of claim 8, wherein the user experience category is a gaming mode, and the combination of peripheral device functional capabilities includes a gaming capability feature of a mouse peripheral device.

10. The method of claim 8, wherein the user experience category is a gaming mode, and the combination of peripheral device functional capabilities includes a gaming capability feature for a keyboard peripheral device.

11. The method of claim 8, wherein the user experience category is a meeting mode, and the combination of peripheral device functional capabilities includes a webcam peripheral device having a resolution level meeting a threshold experience resolution level for a teleconference meeting software application.

12. The method of claim 8, wherein the user experience category is a design development mode, and the combination of peripheral device functional capabilities includes design development software compatible feature for a keyboard peripheral device.

13. The method of claim 8, wherein the user experience category is a design development mode, and the combination of peripheral device functional capabilities includes a minimum resolution threshold for a monitor peripheral device.

14. The method of claim 8, wherein the user experience category is a design development mode, and the combination of peripheral device functional capabilities includes use of a stylus peripheral device.

15. A peripheral device workspace cloud orchestrator executing at a cloud-based information handling system comprising:

a network interface device receiving a user composite peripheral device workspace identifier and a reservation time slot for a user having the user composite peripheral device workspace to reserve one of a plurality of peripheral device workspaces;

the hardware processor accessing a database at the peripheral device workspace cloud orchestrator to identify each of the plurality of peripheral device workspaces with a peripheral device workspace identification value having a manifest of an available plurality of peripheral devices at an identified location that are available for operative coupling with a user anchor information handling system node and operating within one of a plurality of user experience categories, wherein the user composite peripheral device workspace is unique to the user and includes a user experience category linking a workload pattern for the anchor user information handling system node determined based on at least one previously received peripheral device workspace operational and environmental context telemetry reading for the user anchor information handling system node with a combination of peripheral device capabilities for a previously used plurality of peripheral devices capable of handling the workload pattern; and a hardware processor executing code instructions of the peripheral device workspace cloud orchestrator to automatically reserve for the user a configured peripheral device workspace from the plurality of peripheral device workspaces corresponding to one of the plurality of user experience categories that matches a user's experience fingerprint for usage during the reservation time slot in response to a request by the user and current telemetry data for the user.

16. The peripheral device workspace cloud orchestrator of claim 15, wherein the user experience category is a meeting mode and the combination of peripheral device functional capabilities includes a minimum threshold recording resolution for a webcam peripheral device.

17. The peripheral device workspace cloud orchestrator of claim 15, wherein the user experience category is a meeting mode and the combination of peripheral device functional capabilities includes features and configurations of peripheral device nodes for execution of a meeting teleconference software application on the anchor node information handling system.

18. The peripheral device workspace cloud orchestrator of claim 15, wherein the user experience category is a design development mode and the combination of peripheral device functional capabilities includes a color gamut requirement for a monitor peripheral device.

19. The peripheral device workspace cloud orchestrator of claim 15, wherein the user experience category is a design development mode and the combination of peripheral device functional capabilities includes features and configurations of a peripheral device node for execution of a design development software application on the anchor node information handling system.

20. The peripheral device workspace cloud orchestrator of claim 15, wherein the user experience category is a gaming mode and the combination of peripheral device functional capabilities includes a high dots per inch (DPI) value for a mouse peripheral device.

\* \* \* \* \*